United States Patent
Tan

(10) Patent No.: US 6,694,505 B1
(45) Date of Patent: Feb. 17, 2004

(54) METHOD FOR USING A DATA FLOW NET TO SPECIFY AND ASSEMBLE COMPUTER SOFTWARE

(75) Inventor: Hee Beng Kuan Tan, Singapore (SG)

(73) Assignee: Kim Seng Holdings Pte. Ltd., Singapore (SG)

( * ) Notice: Subject to any disclaimer, the term of this patent is extended or adjusted under 35 U.S.C. 154(b) by 0 days.

(21) Appl. No.: 09/457,107

(22) Filed: Dec. 7, 1999

(30) Foreign Application Priority Data

Nov. 25, 1999 (SG) .............................................. 9905714

(51) Int. Cl.$^7$ ............................................... G06F 9/44
(52) U.S. Cl. ...................... 717/100; 717/101; 717/102; 717/103; 717/104; 717/107; 709/115; 709/331; 707/103 R
(58) Field of Search .................................. 717/100, 101, 717/107, 114, 104, 102, 103, 116; 709/318, 332, 331, 315; 710/2, 3, 20, 30

(56) References Cited

U.S. PATENT DOCUMENTS

| | | | |
|---|---|---|---|
| 5,257,363 A | | 10/1993 | Shapiro et al. |
| 5,291,427 A | | 3/1994 | Loyer et al. |
| 5,301,336 A | * | 4/1994 | Kodosky et al. ............ 345/846 |
| 5,341,476 A | | 8/1994 | Lowell |
| 5,412,797 A | | 5/1995 | Rubin |
| 5,475,851 A | * | 12/1995 | Kodosky et al. ............ 345/763 |
| 5,487,141 A | * | 1/1996 | Cain et al. ................... 345/764 |
| 5,497,491 A | * | 3/1996 | Mitchell et al. ............. 709/315 |
| 5,542,085 A | | 7/1996 | Kanzaki et al. |
| 5,610,828 A | * | 3/1997 | Kodosky et al. ............... 716/11 |
| 5,634,124 A | * | 5/1997 | Khoyi et al. ............ 707/103 R |
| 5,659,751 A | * | 8/1997 | Heninger ..................... 709/332 |
| 5,724,589 A | * | 3/1998 | Vold ............................ 709/318 |
| 5,812,981 A | | 9/1998 | Noguchi et al. |
| 5,821,934 A | * | 10/1998 | Kodosky et al. ............ 345/763 |
| 5,867,709 A | | 2/1999 | Klencke |
| 5,920,718 A | | 7/1999 | Uczekaj |
| 5,930,512 A | * | 7/1999 | Boden et al. ................ 717/102 |
| 6,272,672 B1 | * | 8/2001 | Conway ...................... 717/107 |
| 6,292,932 B1 | * | 9/2001 | Baisley et al. .............. 717/114 |
| 6,505,087 B1 | * | 1/2003 | Lucas et al. ................... 700/83 |
| 6,529,910 B1 | * | 3/2003 | Fleskes ......................... 707/10 |

OTHER PUBLICATIONS

Title: An object–oriented requirements specifications method, Author : S. C. Bailin, ACM, 1989.*
Title: The CIP method: component– and model–based construction of embedded systems, Author : Hugo Fierz, ACM, Oct., 1999.*
Title: Extracting Reusable Function by Flow Ggraph–Based Program Slicing, author: Lanubile et al, IEEE, 1995.*
"Exploiting Intellectual Properties in ASIP Designs for Embedded DSP Software" author: Choi et al, ACM, 1999.*
"Partial Dead Code Elimination using Slicing Transformation" author: Bodik et al, ACM, 1997.*
Austrian Patent Office Search Report (Priority Singapore Patent Application No. 9905714–3, filed Nov. 25, 1999), dated Jun. 18, 2002.

* cited by examiner

Primary Examiner—Wei Zhen
Assistant Examiner—Chameli C. Das
(74) Attorney, Agent, or Firm—Blakely, Sokoloff, Taylor & Zafman

(57) ABSTRACT

A method for specifying computer software called the Data Flow Net ("DF Net") which enables the reusability of portions of the software. Computer software is specified by combining sets of code fragments which implement some coherent functionalities. A method to represent a set of code fragments is provided. A method for combining sets of code fragments specified according to the DF Net method is described. A method for transforming software specified according to the DF Net method into executable instructions is further provided.

11 Claims, 14 Drawing Sheets

```
q1:
    CString a;

q2
    long n;

Source Procedure:

#include "table_def.h"
CTable1 table1;
CTable2 table2;
CTemtable temtable;

table1.Open();
if(!table1.IsOpen()) return;
table2.Open();
if(!table2.IsOpen()) return;

table1.MoveFirst();
while(!table1.IsEof())
{
    a=table1.A;
    //reference port of q1 temtable.Open(AFX_DB_USE_DEFAULT_TYPE,
    "Select N from table2 where table2.B=a");
        temtable.MoveFirst();
    while(!temtable.IsEof())
    {
        n=temtable.N;
        //reference port of q2
        //main port of q2
        temtable.MoveNext();
    }
    //main port of q1
    table1.MoveNext();
}
temtable.Close();
table2.Close();
table1.Close();
```

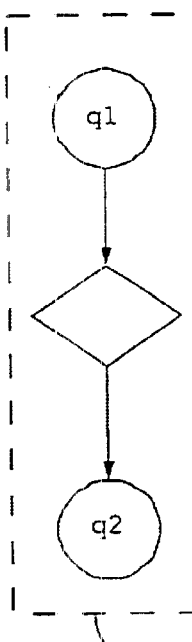

Fig. 5a

```
q1:
      CString subjid;
q2:
      long mark;

Source Procedure:

#include "table_def.h"
Csubject subject;
Cresult result;
CTemtable temtable;

subject.Open();
if(!subject.IsOpen()) return;
result.Open();
if(!result.IsOpen()) return;

subject.MoveFirst();
while(!subject.IsEof())
{
    subjid=subject.subjid;
    //reference port of q1 temtable.Open(AFX_DB_USE_DEFAULT_TYPE,
       "Select mark from result where
       result.subjid=subjid");
    temtable.MoveFirst();
    while(!temtable.IsEof())
    {
        mark=temtable.mark;
        //reference port of q2
        //main port of q2
        temtable.MoveNext();
    }
    //main port of q1
    subject.MoveNext();
}
temtable.Close();
result.Close();
subject.Close();
```

563

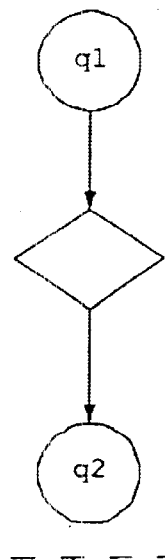

```
/*Updating Subject Average Program*/

{
#include "table_def.h"

CString subjid;

long mark;

long average;

Csubject subject;
Cresult result;
CTemtable temtable;

subject.Open();
if(!subject.IsOpen()) return;
result.Open();
if(!result.IsOpen()) return;

subject.MoveFirst();
while(!subject.IsEof())
{
    subjid=subject.subjid;
    long t1count=0,t1total=0;
    //reference port of q1
    temtable.Open(AFX_DB_USE_DEFAULT_TYPE,"select mark from result
            where result.subjid=subjid");

temtable.MoveFirst();
    while(!temtable.IsEof())
    {
        mark=temtable.mark;
        t1total =t1total+mark;
        t1count++;
        //reference port of q2
        //main port of q2
        temtable.MoveNext();
    }
    if (t1count>0)
      {
        average=t1total/t1count;
        db.ExecuteSQL("Update subject set subject.average=average where
                subject.subjid=subjid");
        //reference port of p3
        //main port of p3
      };

//main port of q1
    subject.MoveNext();
}
temtable.Close();
result.Close();
subject.Close();
}
```

METHOD FOR USING A DATA FLOW NET TO SPECIFY AND ASSEMBLE COMPUTER SOFTWARE

FIELD OF THE INVENTION

The present invention relates to the field of computer software programming, methods for specifying software programs before they are written in a programming language, and methods for implementing software specified according to the method. The method also relates to the field of automatic conversion of software from specification to programming languages. In addition, the present invention relates to the field of software evolution, and more specifically, the field of reuse of portions or fragments of software code which provide some coherent functionalities. The methods are beneficial in both design and implementation of computer software.

BACKGROUND

Despite much research and many promising products, the software industry is still struggling to find ways to improve software quality while reducing the costs of software production. The software industry also faces many difficulties in coping with the maintenance and evolution of software systems. It is well recognized that reusability is key to further improving software productivity and quality. However, for the development of new software systems, substantial redesign and redevelopment of parts of existing software that deliver some coherent functionalities that have been developed earlier is required. These parts will be referred to as functional factors. A functional factor is implemented by a set of code fragments in a program. Functional factors range from small to large in size. However, these functional factors cannot be separately and precisely represented in existing techniques, development environments and languages. As such, in the present state of the art, these functional factors cannot be developed separately and cannot be reused by later developed systems that would benefit from them because they interface with and/or are intertwined with other functional factors. The lack of a representation or an architecture that provides for the separate definition and composition of functional factors to form a software system prevents the reuse of functional factors.

The majority of software maintenance activity involves incorporating new functional factors, modifying existing functional factors and removing out-dated or no longer needed functional factors. The present state of the art does not support a direct mapping between a functional factor and that portion of a software system that implements the functional factor. Most functional factors are implemented in fragments of software code buried in a system and intertwined with other functional factors. As a result, typical maintenance and evolution activity results in time-consuming, high-impact, invasive modification to a system.

In summary, a problem in software development today is the inability to assemble software systems from functional factors in a manner similar to the process of assembling a hardware system from defined parts. This problem exists because functional factors cannot be represented separately without including other interfacing functional factors. This prevents reusing functional factors by assembling them to form a program. The Data Flow Net provides a solution to this problem.

SUMMARY

Although software engineering has made much advancement in recent years, a large amount of commonly encountered fragments of software which provide some coherent functionalities cannot be effectively specified and easily developed for reuse. Portions of software can be analogized to parts called functional factors. Because these functional factors are tightly embedded in the program in which they are included, they cannot be reused in other programs that could benefit from them. The Data Flow Net (DF Net) is a novel software representation which provides a method for effective assembling of software systems from software parts known as functional factors. The functional factors are both easily reusable and provide for enhanced maintainability of the software system.

Other features and advantages of the invention will be apparent from the accompanying drawings and from the detailed description that follows below.

BRIEF DESCRIPTION OF THE DRAWINGS

The invention is illustrated by way of example and not by way of limitation in the figures of the accompanying drawings in which like references indicate similar elements and in which:

FIG. 5a depicts the parameterized DF Net for joining two tables.

FIG. 5b depicts the DF Net for joining subject and result tables.

FIG. 9 depicts the object oriented source code in C++ which implements the compute and update subject average DF Net.

DETAILED DESCRIPTION

A. The Data Flow Net

Figure 1C:
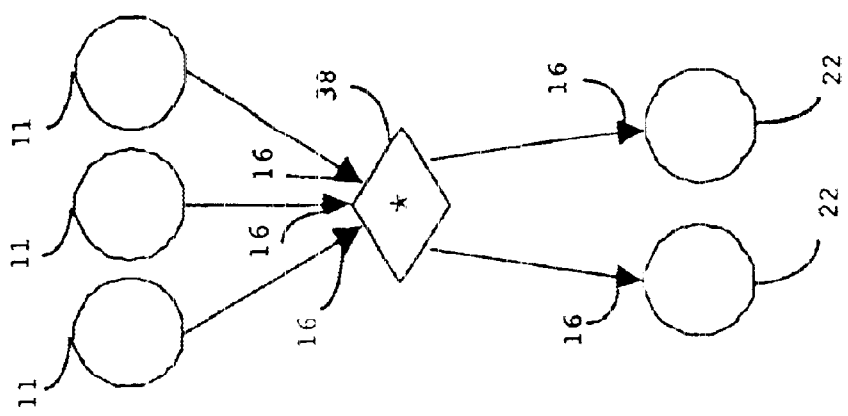
FIG. 1c depicts a mapping of an AND multiple hierarchical dependency.

The Data Flow Net (DF Net) is a software architecture based on data flow and object-oriented concepts. It has matured through various embodiments. One embodiment was developed in Delphi (with object-oriented Pascal as its base language) to implement a proposed model for developing Cobol programs. In this embodiment, a simulation approach was used to capture Cobol programs specified in graphical software models. Due to the difficulty in programming graphical user interfaces in Cobol, only textual user interfaces were supported.

Another embodiment of the DF Net system was developed in Visual C++. This embodiment provides a comprehensive graphical user interface to capture proposed graphical models. The DF Net has also been embodied for analysis and design patterns. Other embodiments of the DF Net extend to Visual C++ and the Java Development Kit (JDK). These embodiments accept programs specified in DF Nets with Visual C++ and JDK as their respective base languages. These DF Nets are automatically transformed into Visual C++ and JDK for implementation.

The DF Net of the present invention allows for the separate and precise representation of software parts to realize or implement some coherent functionalities. These parts are implemented as a set of code fragments in a program. Many of these reusable parts cannot be expressed in terms of existing software concepts such as class, operation (method), function, procedure and the existing idea of what a software component is. Existing approaches do not allow for representation of software parts separately and precisely in a way that allows for reuse in composing software systems. As an improvement to existing approaches, the DF Net can represent software parts by a parameterized DF Net.

The DF Net of the present invention allows for the representation of various sized analysis and design patterns. In such an embodiment, an analysis or design pattern is represented by a set of parameterized DF Nets supplemented by referenced software artifacts.

The DF Net of the present invention also allows for the realization of a use-case for analysis purposes. In such an embodiment, a DF Net is constructed for the realization. In such a DF Net, a transition is not defined according to the exact DF Net construct (that is, a process and a predicate which comprise sets of procedures, which will be discussed in more detail below), but is specified informally by a textual natural language description.

The DF Net of the present invention also allows for the realization of a use-case for design purposes and implementation. A precise DF Net is constructed for the design of a use-case. In such a DF Net, all the procedures and attributes are written in the target object-oriented programming language. The DF Net can automatically be transformed to the target programming language for implementation. No additional work is required for implementation after the automatic transformation.

A DF Net for the realization or implementation of a use-case is constructed from the composition of multiple DF Nets which realize or implement a set of coherent functionalities in the use-case. A member DF Net can be instantiated from a parameterized DF Net stored in a library. It can also be defined by inheriting from a DF Net or a parameterized DF Net stored in a library. For the last case, both inheritance and instantiation are applied to define the member DF Net. In such an embodiment, most of the member DF Nets are defined from DF Nets stored in libraries. In such a composition, before a parameterized DF Net is added, it must be instantiated. Both inheritance and instantiation may be applied to define a member DF Net. In such an embodiment, the inheritance is applied to yield the specific parameterized-DF Net before the instantiation is carried out.

In addition to the individual construction of DF Nets, a rich set of analysis and design patterns may be captured for use in the target application domain, resulting in a large-scale benefit from reuse. That is, a large part of a system can be constructed in one step from an analysis or design pattern stored in a library. In such an embodiment, this is achieved through the application of inheritance, instantiation or combination. Similar to the case of constructing DF Nets individually, inheritance is always applied before the instantiation is carried out if both are applicable.

In addition to the reuse of variable sized software parts, the DF Net also separates the realization or implementation of independent functionalities in a use-case. As a result, the DF Net of the present invention makes systematic assembly of software systems from parts which realize or implement a set of coherent functionalities possible.

A Petri net is a widely accepted system modeling tool. In one embodiment, the DF Net of the present invention is developed by modifying and extending a high-level timed Petri net of the type known in the art. However, the use of high-level Petri nets in the DF Net is not necessary. Petri net notation and concepts are used because they provide a well known and commonly understood set of notations and concepts that can be used to describe the DF Net of the present invention.

The basic components represented in the DF Net are as follows: data flow, instance of a data flow, hierarchical dependency between data flows, production of output data flows from input data flows, and production of data flow instances for a production of output data flows from input data flows. In Petri net terminology, these concepts are represented, respectively, as: place, token, hierarchical dependency, transition and firing a transition. However, any other notation and name schemes well known in the art can be used to represent these components.

A functional factor is a part of a program that delivers some coherent functionalities. A functional factor is implemented by a set of code fragments in the program. For example, the part of a program that reads product records according to certain criterion is a functional factor. The part of a program that determines an average is a functional factor.

A data flow in a program is a set of variables that are accessible at a statement in the program. Each set of values of these variables during an execution of the program is an instance of the data flow. A basic data flow is a data flow in which all its data attributes are single-valued.

The basic philosophy of the DF Net is as follows: first, a functional factor is specified by explicitly representing the basic data flows that interact with the external environment graphically in a high-level Petri net-like diagram; and, second, a composite functional factor is developed from other existing functional factors by using the output data flows of one functional factor as the input data flows of another functional factor.

The DF Net of the present invention is comprised of places, hierarchical dependencies between places, transitions, a source procedure and sink procedures. The DF Net is represented as a high-level Petri net-like diagram which shows the relationship of its constituents and the definition or specification of these constituents. The transitions, the source procedure and the sink procedures interface only through places.

1. Places and Tokens

A place represents a basic data flow from and to its environment. Consequently, the attributes of the data flow form the attributes of the place. A token of the place represents an occurrence or instance of the data flow. Tokens have a value for each attribute of the place.

In the DF Net, "blocking" of tokens is not allowed. That is, blocking of data flow instances is not allowed. Therefore, at any point in time, there is at most one token of a particular place. A newly produced token overrides the existing token. A major difference between the DF Net and the known high-level Petri net is that during the firing of a transition no tokens are consumed; only reference to tokens of places is made.

2. Hierarchical Dependency

Figure 1B:
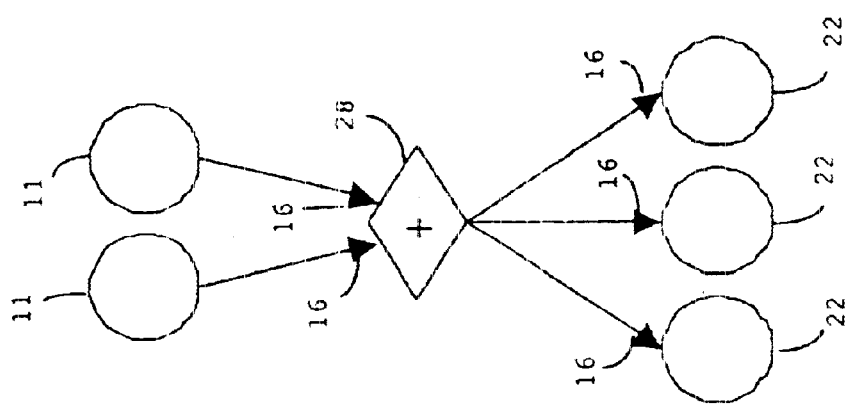
FIG. 1b depicts a mapping of an OR multiple hierarchical dependency.
Figure 1A:
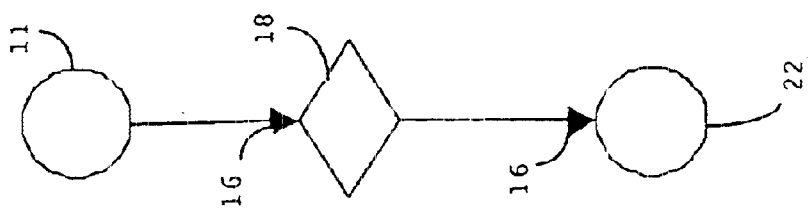
FIG. 1a depicts a mapping of a single hierarchical dependency.

In addition to defining the production of tokens as transitions, the DF Net represents hierarchical dependencies. Hierarchical dependency is represented as a diamond as shown in FIGS. 1a, 1b and 1c. Each place is connected to the diamond by an arc with a solid arrowhead pointing to the dependant place. For the following discussion, let $p$, $p_i$ ($1 \leq i \leq n$) and $q_j$ ($1 \leq j \leq m$) be places.

If the tokens of places $q_1, \ldots, q_m$ are produced for each token of a place p, then $q_1, \ldots, q_m$ are hierarchically dependent on p through Single Hierarchical Dependency. FIG. 1a shows an example of Single Hierarchical Dependency in which place 22 is dependent on place 11 as represented by dependency diamond 18 and arrows 16.

If the tokens of places $q_1, \ldots, q_m$ are produced for each token of place $p_i$ where $1 \leq i \leq n$, then $q_1, \ldots, q_m$ are hierarchically dependent on $p_1, \ldots, p_n$ through "OR" Hierarchical Dependency. FIG. 1b shows an example of "OR" Hierarchical Dependency in which places 22 are dependent on places 11 as represented by dependency diamond 28 and arrows 16.

If the tokens of places $q_1, \ldots, q_m$ are produced for each combination of n tokens one from each $p_i$ where $1 \leq i \leq n$, then $q_1, \ldots, q_m$ are hierarchically dependent on $p_1, \ldots, p_n$ through "AND" hierarchical dependency. The tokens are combined according to their occurrence sequence. FIG. 1c shows an example of "AND" Hierarchical Dependency in which places 22 are dependent on places 11 as represented by dependency diamond 38 and arrows 16.

3. Transitions

In the DF Net, the production of a set of coherent data flows from other data flows is represented by a transition. The places that represent the input data flows of the transition form the input places of the transition. The places that represent the output data flows of the transition form the output places of the transition. Some input places are designated as main input places of the transition. The designation must be made in such a way that a relationship between the input places holds. These relationships are discussed in more detail below.

Figure 2C:
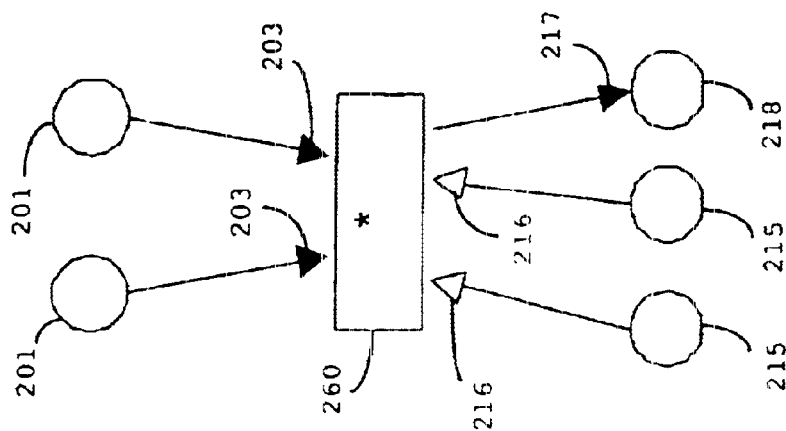
FIG. 2c depicts a mapping of a portion of a DF Net showing multiple main input places connected with AND logic.
Figure 2B:
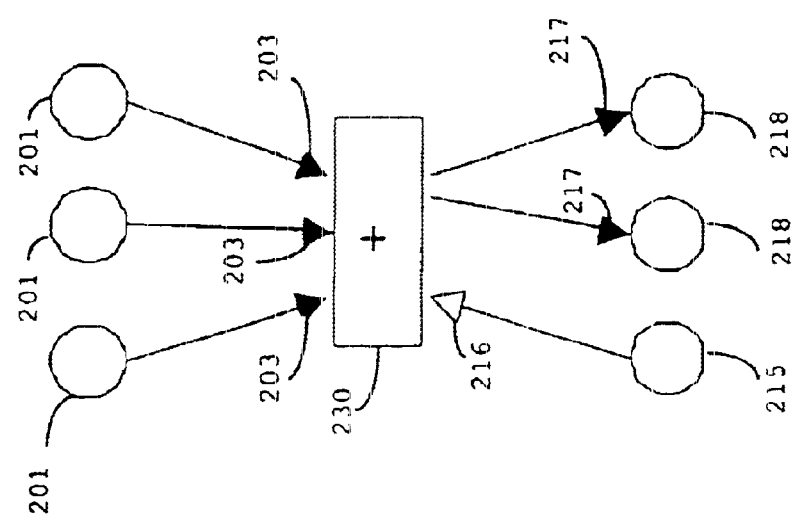
FIG. 2b depicts a mapping of a portion of a DF Net showing multiple main input places connected with OR logic.
Figure 2A:
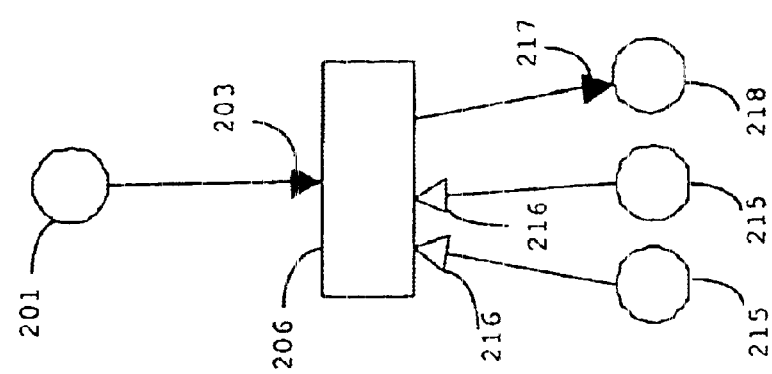
FIG. 2a depicts a mapping of a portion of a DF Net showing a single main input place.

If there is more than one main input place, the main input places will either combine by OR logic as shown in FIG. 2b, or by AND logic, as shown in FIG. 2c, in the same manner as conventional Petri nets. Each main input place is connected by an arc, which has a solid arrowhead to the transition. Each of the remaining input places (non-main input places) are connected by an arc with a hollow arrowhead to the transition. FIGS. 2a, 2b and 2c depict mappings showing three kinds of transitions, each with varying numbers of main input places.

FIG. 2a is an example of a representation of a single main input place. Single main input place 201 is connected to transition rectangle 206. This figure also shows two non-main or ordinary input places 215 designated by hollow arrowheads 216. Single output place 218 is depicted. Arrows 203 and 217 designate main input place 201 and output place 218 of transition 206.

FIG. 2b is an example of a representation of multiple main input places connected by OR logic to a transition. Multiple main input places 201 are connected by OR logic to transition rectangle 230. This figure also shows one non-main or ordinary input place 215 designated by hollow arrowhead 216. Two output places 218 are depicted. Arrows 203 and 217 designate main input places 201 and output places 218 of transition 230.

FIG. 2c is an example of a representation of multiple main input places connected by AND logic to a transition. Multiple main input places 201 are connected by AND logic to transition rectangle 260. This figure also shows two non-main or ordinary input places 215 designated by hollow arrowheads 216. Single output place 218 is depicted. Arrows 203 and 217 designate main input places 201 and output place 218 of transition 260.

If there is a sequence of places $p_1, \ldots, p_n$ where (n>1) in a DF Net such that for each i, $2 \leq i \leq n$, either $p_i$ is hierarchically dependent on $p_{i-1}$ through a hierarchical dependency that may involve other places, or $p_{i-1}$ is a main input place of a transition in which $p_i$ is an output place of the transition, $p_1$ is called an ancestor place of $p_n$, and $p_n$ is called a descendant place of $p_1$.

Depending on the number of main input places and their combination logic, the following relationship between input places must hold in any transition. If there is a single main input place, all non-main input places are descendant places of the main input place. If there are multiple main input places combined by OR logic, each non-main input place is a descendant place of one and only one main input place. If there are multiple main input places combined by AND logic, each non-main input place is a descendant place of one or more main input places.

4. Process and Predicate

In the DF Net of the present invention, the functional behavior of a transition is defined by a process which may be supplemented by a predicate. The process is comprised of procedures that cannot define or redefine any attribute of any place that is not an output place of the transition. One of the procedures is designated as the main procedure of the transition, and the remaining procedures are called reference procedures of the transition. Each of the reference procedures is registered to either an input place of the transition or to an ancestor place of a main input place of the transition. A reference procedure registered to a place may make reference to attributes of the place. A reference procedure registered to a place may also make reference to attributes of the following places as well as variables defined in other reference procedures registered to the following places: main input places that are ancestor places of the place and ancestor places of these main input places, if the place is a non-main input place; or ancestor places of the place, if the place is a main input place. The reference procedures support the main procedure by defining some of the main procedure's variables. The reference procedures do not produce any data flows and, thus, produce no tokens.

The main procedure of a transition produces the tokens of the output places of the transition. That is, the main procedure produces data flows represented by the output places of the transition. The main procedure may make reference to the following as variables: attributes of any input places, attributes of an ancestor place of a main input place, and variables defined in any reference procedure of the transition.

The predicate for a transition is comprised of procedures structured in the same way as the process for the transition. However, in a predicate, no procedure can define or redefine any attribute of any place. The main procedure of a predicate does not produce any tokens. The procedures of a predicate define the value of a Boolean variable, To-Fire, for the transition.

5. Source and Sink Procedures

In the DF Net of the present invention, places that are not output places of any transition are called source places. A procedure called source procedure is defined in the DF Net to produce the tokens of some source places. Source places may be related through hierarchical dependencies or may be independent. The source procedure does not refer to, define, or redefine any attributes of places or any variables not produced by it.

In a DF Net, source places of tokens which are not produced by the source procedure represent data flows that are required by, but are not produced in, the DF Net. These source places are input places of the DF Net. All other places are output places of the DF Net.

Any number of procedures can be registered to a place in a DF Net to use the token values of the place to interact with its environment. Example interactions include update of a database record, response to a user, printing information, etc. Each such procedure is called a sink procedure of the place. A sink procedure registered to a place may refer to attributes of the place or attributes of any ancestor of the place. However, sink procedures can neither define nor redefine attributes of any places.

B. Execution of a Data Flow Net

In the DF Net of the present invention, a transition is fired by executing the transition's main procedure. A transition is ready for firing if the following three conditions are met. First, the determination of when a transition is ready for firing depends on the number of main input places and the combination logic. If there is one main input place, the main input must have a new token which has not yet fired the transition (that is, caused the transition to be fired). If there are multiple main input places combined by AND logic, each main input place must have a new token which has not yet fired the transition. If there are multiple main input places combined by OR logic, one of the main input places must have a new token which has not yet fired the transition. Second, all the tokens of the non-main input places that are descendant places of any main places of the transition that can be produced as a result of the tokens in the first condition must have been produced. Third, and last, the Boolean variable To-Fire associated with the transition must be true. To-Fire is always true if the transition does not have a predicate.

The execution of a DF Net begins with the execution of the DF Net's source procedure. During the execution of the source procedure, tokens of some of the DF Net's source places will be produced, causing some transitions to become ready for firing. Consequently, the main procedures of these transitions are executed. In turn, the execution of any of the main procedures causes other transitions to become ready for firing. As a result, the main procedures of these transitions are executed. The execution of the source procedure and any main procedure will also lead to the execution of reference procedures (for both process and predicate) and sink procedures that are registered to the places that represent the tokens, which are produced by the source and main procedures. As a general rule, once a token of a place is produced, no further token of the place will be produced until all the transitions that can be fired as a result of the token have been fired. On the other hand, during the execution of the source procedure and any main procedure, upon the production of any token that is represented by a place to which reference procedures (for both process and predicate) or sink procedures are registered, the procedures will be executed immediately. To evaluate the readiness to fire a transition with a predicate defined, the main procedure of the predicate is executed to define the Boolean variable, To-Fire.

In the execution of a DF Net, the execution of the source procedure and the execution of any main procedure are exactly the same. The source procedure or any main procedure is executed until a statement that produces a data flow that is represented by a place in the DF Net is executed. Execution of the source and main procedures resumes when: (i) each reference procedure and sink procedure registered to the place has completed execution; and (ii) the main procedures of the transitions that become ready for firing as a result of the production of the data flow have completed execution.

Figure 3A:
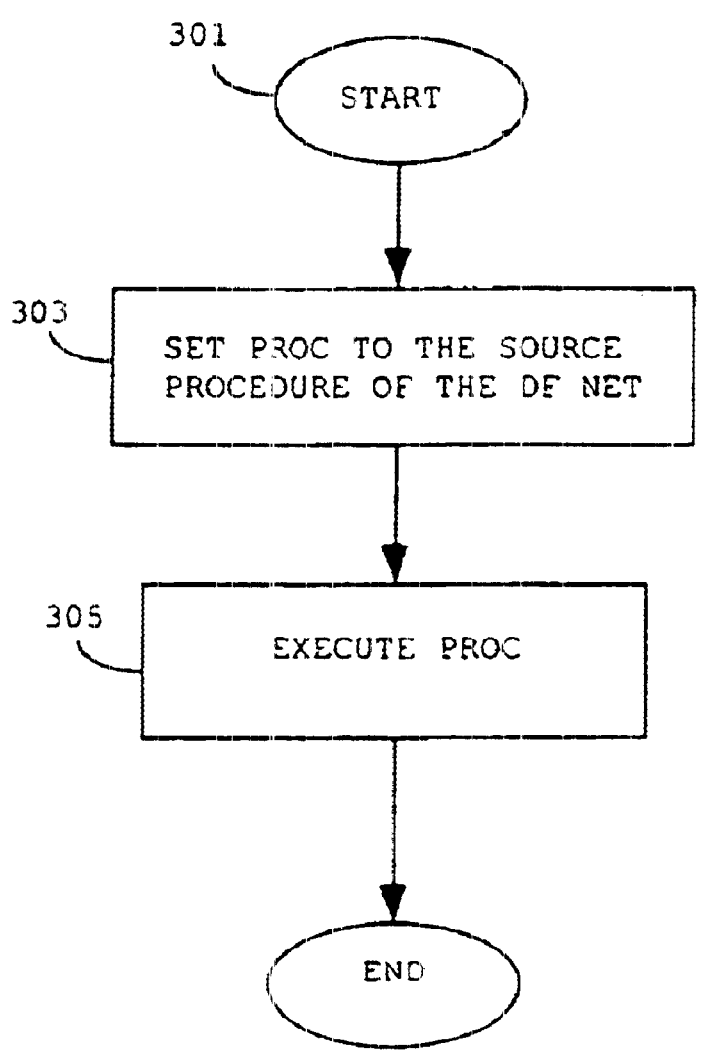
FIG. 3a depicts the main flow of execution of a DF Net.
Figure 3B:
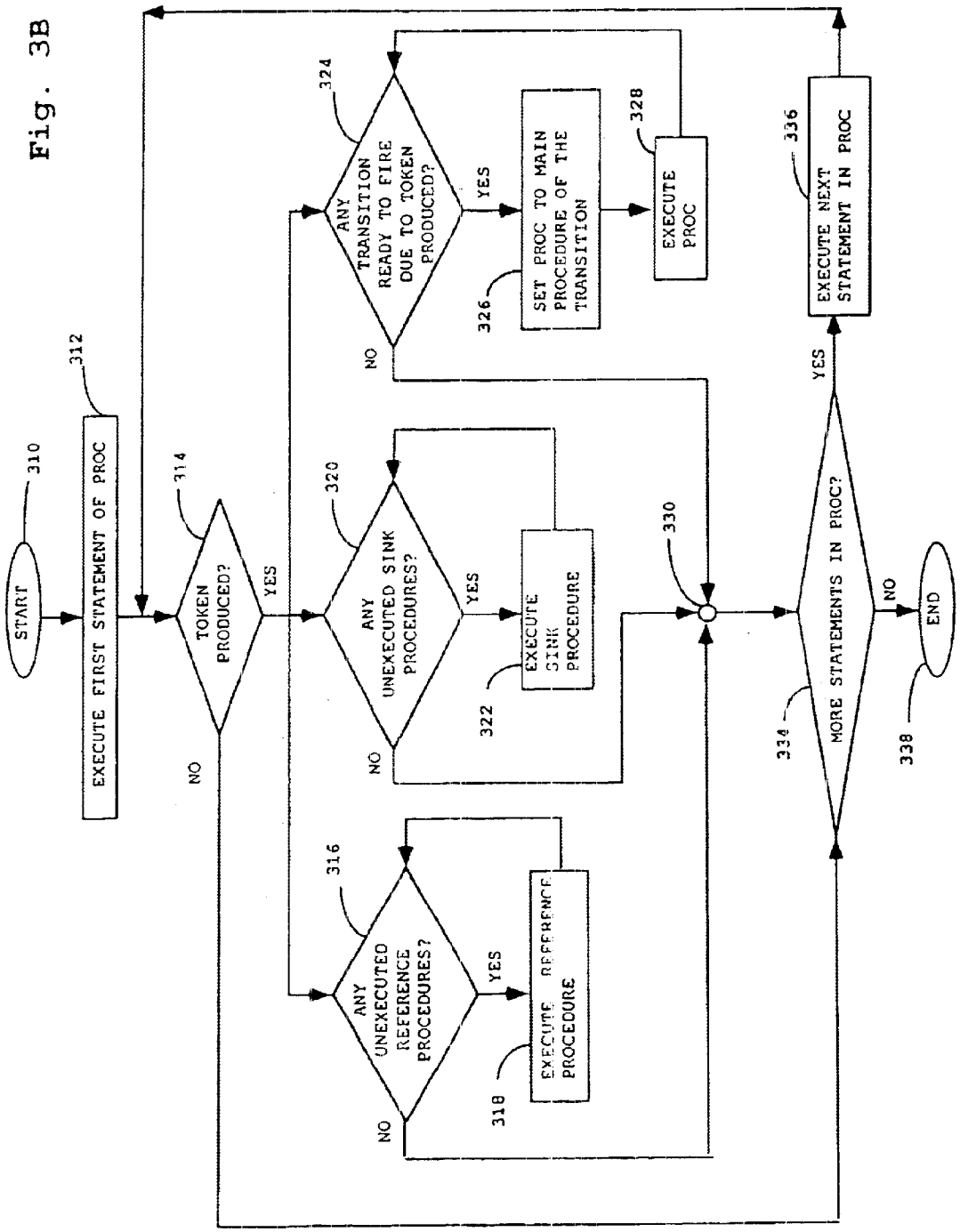
FIG. 3b depicts the detailed flow of execution of a DF Net.

FIGS. 3a and 3b are flow charts showing the execution of a DF Net. As shown in FIG. 3a, the execution of a DF Net begins at 301. Fist, a procedure, Proc, is set to the DF Net's source procedure at 303. Then, as seen at 305, Proc is executed according to the flow chart shown in FIG. 3b. As shown in FIG. 3b, the execution of Proc occurs statement by statement. The execution of Proc begins at 310. First, the first statement s in Proc is executed as seen at 312. After the execution of the statement s, what occurs next is determined by whether s produces a token tk of a place p in the DF Net as seen at 314. If s produces a token tk, the processing beginning with 316, 320 and 324 is performed in any sequence or concurrently. In no particular order, first, each reference procedure registered to p is executed statement by statement, from the first statement to the last statement, as seen at 316 and 318. Second, each sink procedure registered to p is executed statement by statement, from the first statement to the last statement as seen at 320 and 322. Third, for each transition that is ready for firing due to the production of tk, Proc is set to the main procedure of the transition, and the newly assigned Proc is then executed as seen at 324, 326 and 328. The execution as seen at 324, 326 and 328, and in particular at 328, is recursive. The execution beginning with 316, 320 and 324 can be performed in any sequence or concurrently. Next, if the statement s does not produce any token represented by a place in the DF Net, or when the processing from all branches 316, 320 and 324 has completed as seen at 330, the next statement in Proc is executed in the same manner as the statement s, as seen at 334 and 336. This continues until the end of Proc is reached, as seen at 338.

Figure 4:
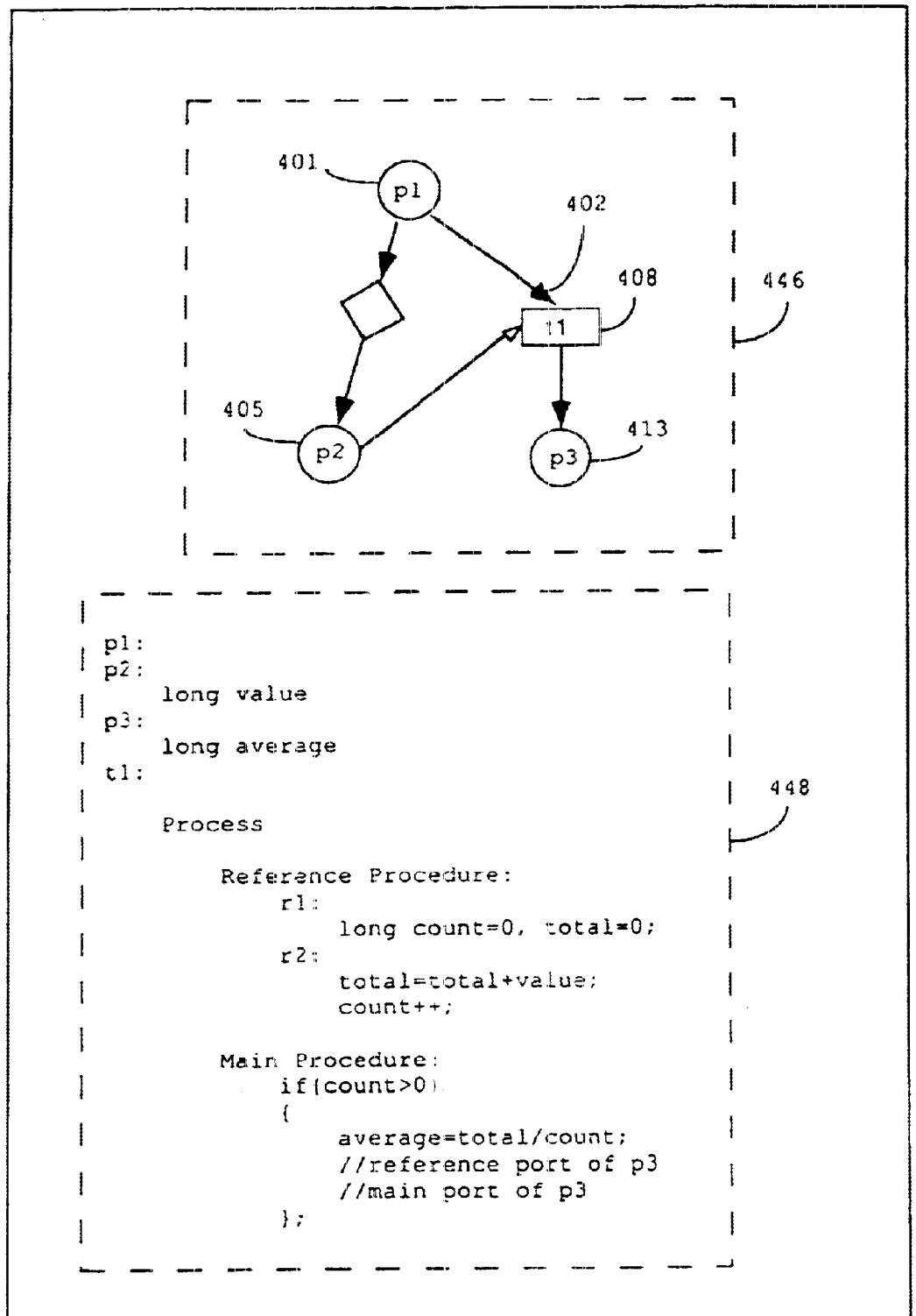
FIG. 4 depicts compute average parameterized DF Net.

FIG. 4 depicts a parameterized DF Net to compute an average 444. The parameterized DF Net to compute an average 444 is comprised of a mapping portion 446 and a procedures and attributes portion 448. More specifically, FIG. 4 depicts a parameterized DF Net for a small generic functional factor which computes an average for any set of numeric values. Referring to FIG. 4, this functional factor refers to three data flows represented by places p1 (401), p2 (405) and p3 (413). Places p1 and p2 are each registered with a reference procedure. For each token of place p1, there is a set of tokens of place p2 which represent a numeric value. That is, the place p1 represents a data flow of which each occurrence (a token of p1) results to a set of tokens of p2. For each token of place p1, the functional factor produces a token of place p3 that represents the average of the numeric values represented by the set of tokens of place p2 that are dependent on the token of place p1. The average is computed by t1.

In the parameterized DF Net 444 shown in FIG. 4, transition t1 (408) is the only transition. Places p1 (401) and p2 (405) are the input places of transition t1. Places p1 and p2 are also the input places of the functional factor as shown in FIG. 4. Place p1 is the only main input place of transition t1 as shown by arrow 402 in mapping 446 of FIG. 4. Place p3 (413) is the only output place of transition t1 (408). Place p3 is also the only output place of the functional factor. Each token of place p2 has an attribute with numeric value. For each of the tokens of place p1, transition t1 is fired. The average of the numeric values represented by the tokens of place p2 that are dependent on the token of place p1 is then computed. The average is represented by a token of place p3 with attribute named "average" as shown in the procedures and attributes 448 of FIG. 4. The average is produced by the statement, "average=total/count" in the main procedure of transition t1 as shown in 448 of FIG. 4.

In the compute average functional factor shown in FIG. 4, other than the properties stated, there is no further requirement on data flows represented by places p1 and p2. As such, the compute average functional factor can be used to compute an average in any environment regardless of the source of the numeric values required as input. For example, the numeric values can be from database records or input entered directly by a user from a keyboard. No other current technique provides for such a general interface. This enhances the reusability of the compute average functional factor.

The DF Net of the present invention can represent executable software systems and use cases. It can also represent parts of software systems and use cases that deliver parts of the functionality provided by the software systems and the use cases. In a DF Net under the latter case, input places of the DF Net represent the external data flows required by the DF Net. These data flows are provided by other DF Nets. In a DF Net that represents an executable program, the tokens of all source places are produced by the source procedure of the DF Net. As such, the latter DF Net does not have input places.

C. Composition of Data Flow Nets

Figure 10:
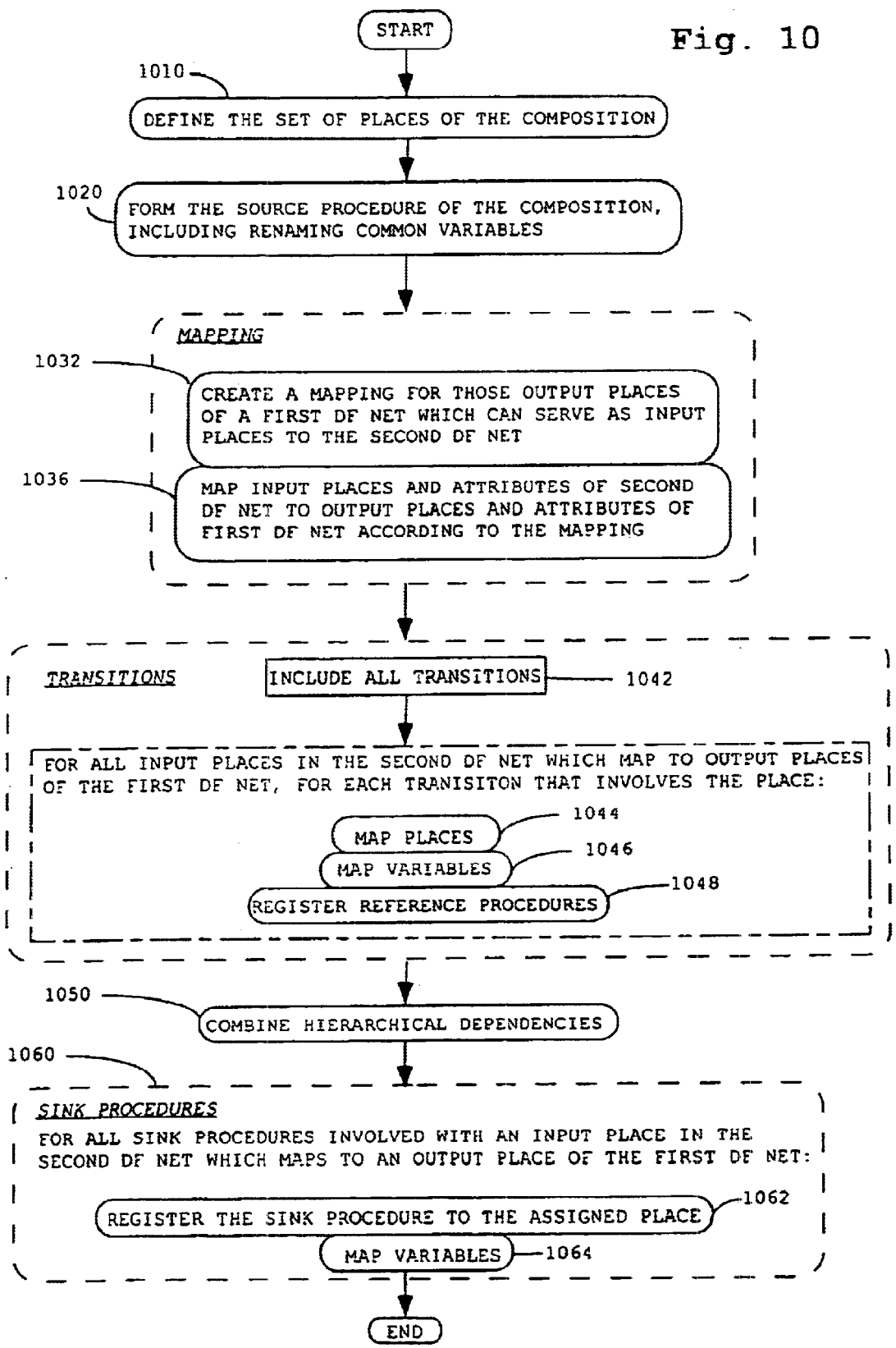
FIG. 10 depicts a flow chart of the steps taken in combining two DF Nets to make a third DF Net.

Two data flow nets can be combined to form a composite DF Net. In a composition of two DF Nets, some output places of a first DF Net serve as input places of a second DF Net. An output place that is assigned to serve as an input place must have all the required properties of the input place. The formal definition of the composition of two Data Flow Nets is as follows: $D_1$ and $D_2$ are two DF Nets; $P_1$, $T_1$, $R_1$ and $SKP_1$ are the set of places, transitions, dependencies and sink procedures in $D_1$; $P_2$, $T_2$, $R_2$ and $SKP_2$ are the set of places, transitions, dependencies and sink procedures in $D_2$; O is the set of output places in $D_1$; I is the set of input places in $D_2$ and J is a subset of I. A composition of $D_1$ and $D_2$ is formed as follows, as can be seen in FIG. 10.

First, the set of places of the composition is defined as $(P_1 \cup P_2)-J$, as represented by block 1010.

Second, the asynchronous combination of the source procedures of $D_1$ and $D_2$ forms the source procedure for the composition, as shown in block 1020. Any common variables declared in both $D_1$ and $D_2$ are made unique during this combination.

Third, each input place P in J is assigned to a place $\phi(p)$ in O according to a mapping $\phi$ that maps J into O, as shown in blocks 1032 and 1036. Mapping $\phi$ is also referred to as an IP mapping. In conjunction with this assignment, each attribute in the place, P, is assigned to a compatible attribute in $\phi(p)$ according to a mapping $\theta_p$ that maps the set of attributes of p into the set of attributes of $\phi(p)$. Mapping $\theta_p$ is also referred to as an AIP mapping. The mapping $\theta_p$ is derived automatically if there is a unique correspondence in terms of data types between the attributes of p and $\phi(p)$.

Fourth, each transition in $D_1$ and $D_2$ becomes a transition in the composition, as shown in 1042. In conjunction with the above assignment of input places in J, the following replacement is carried out for each transition t in $D_2$:

a) If m is an input place of t in $D_2$ and m∈J, then replace m with $\phi(m)$, as shown in block 1044;

b) For each procedure, proc, of transition t in $D_2$, for each variable v referenced in proc that is an attribute of a place p in J, replace v and its type with $\theta_p(v)$ and its type, respectively, as shown in block 1046; and c) If ref-proc is a reference procedure of t in $D_2$ that is registered to a place n∈J, then register it to $\phi(n)$ instead of n, as shown in block 1048.

Fifth, the set of hierarchical dependencies for the composition is the union of the sets of hierarchical dependencies of $D_1$ and $D_2$ with all the hierarchical dependencies between places in J removed, as shown in block 1050.

Sixth, for each sink procedure, sk-proc, that is registered to a place p in J in $SKP_2$, register it to $\phi(p)$ instead of p, as shown in blocks 1060 and 1062. For each of these sink procedures and other sink procedures in $SKP_1$ and $SKP_2$, for each of variable v that is an attribute of a place q in J, replace v and its type with $\theta_p(v)$ and its type, respectively, as shown in block 1064. All the resulting sink procedures form the sink procedures for the composition.

The mapping $\phi$ must preserve the ancestor-descendent relationships between places. That is, if m and n are places in $D_2$ such that m is an ancestor of n, then:

1) If m∈J and n∉J, then $\phi(m)$ is an ancestor of n.

2) If m∉J and n∈J, then m is an ancestor of $\phi(n)$.

3) If m∈J and n∈J, then $\phi(m)$ is an ancestor of $\phi(n)$.

In the composition, the names identifying some transitions, places and hierarchical dependencies might have to be reassigned for uniqueness purposes.

The DF Net can be applied using existing technology. In one embodiment, the DF Net is applied with object-oriented and reuse technologies. In this embodiment, procedures in DF Nets may be defined through the use of operations in reusable classes. Object-oriented concepts can be applied in this manner. For example, Visual C++ is used to generate GUI (Graphical User Interface) Classes for defining the GUI of the application system in which the DF Net is implemented in Visual C++.

In this embodiment, DF Nets themselves can also be viewed as classes with places and transitions as their features. Through an inheritance mechanism, it is possible to define a new DF Net by inheriting features from an existing DF Net. New features can be incorporated and unwanted features can be overridden as required. The resulting new DF Net defines only the places and transitions that are added and overridden. Furthermore, places can also be viewed as classes with attributes as their features. Transitions can be viewed as classes with procedures and predicates as their features. For places and transitions inherited from an existing DF Net, the inheritance mechanism allows inheritance of the required features from the corresponding places and transitions. This also allows the resulting new DF Net to augment and to override the features of an existing DF Net to meet specific requirements.

In this embodiment, the two-level inheritance mechanism allows flexible reuse of functional factors. When an existing DF Net is used to define a new DF Net, only those specific features that are not provided in the existing DF Net need be defined. The resulting DF Net can also remove and override unwanted features from the existing DF Net. Other needed features are inherited from the existing DF Net.

D. Parameterized Data Flow Nets

Reuse technology can be classified into composition and generation approaches. The DF Net supports the effective assembly of software parts to form software systems. Reusable software parts including non-executable artifacts can be stored in a library for the assembly of new systems. As a result, the DF Net extends the scope of the composition approach. In such an embodiment, the DF Net methodology can be implemented with known reuse techniques to support the composition approach. In particular, a parameterization technique is used for all reusable DF Nets stored in the library. Each such DF Net is called a parameterized DF Net.

In a parameterized DF Net, the places, including their attributes, are formal parameters. These places and attributes are called formal places and formal attributes. Other formal parameters (e.g., variable condition) may also be included in the processes and predicates in a parameterized DF Net. For example, FIG. 4 depicts a parameterized DF Net 444 to compute an average.

To yield a DF Net from a parameterized DF Net, all the formal output places and their attributes must be instantiated to actual places and attributes. All formal parameters in the procedures and predicates must also be instantiated to actual values. However, for yielding an actual DF Net from a parameterized DF Net, the formal input places and their attributes need not be instantiated. The reason is that these places represent the required data flows. They are always assigned to places in other DF Nets that provide the data flows. The formal attributes of a formal place represent the minimum attributes required by the place. As such, it can be instantiated to an actual place that has more attributes than the formal place.

E. An Example Data Flow Net

As an example of one embodiment of the DF Net, the process for assembling a program from its required functionalities follows. That is, a composite DF Net is formed from three simple functionalities. In this example, the compute average and join table functionality DF Nets are combined to form a DF Net for computing the average of each subject in a subject table. An update table functionality is then incorporated into the composite DF Net to form the required program. For each subject record in the subject table, this program processes all the result records for the subject in the result table and updates the subject average. The subject table has three attributes: subjid, subjname and average. These represent the subject identifier, subject name and subject average, respectively. The result table has three attributes: subjid, studentid and mark. These represent the subject identifier and mark obtained, respectively. The program requires the following functionalities: (1) read the result records of the subject for each subject record; (2) compute the average of all the results of the subject for each subject record; and (3) update the average for each subject record.

The first two functionalities are instantiated from two generic functionalities. The first generic functionality joins records from a first table to records of a second table according to the equality of values of a particular attribute from each table. The second generic functionality computes the average of any set of numeric values. The first generic functionality is specified by a parameterized DF Net as shown in FIG. 5a. The second generic functionality is specified by a parameterized DF Net as shown in FIG. 4.

The parameterized DF Net in FIG. 5a specifies the first generic functionality to join two tables 555. This parameterized DF Net is comprised of mapping portion 557 and procedures and attributes portion 559. As shown in the procedures and attributes 559 of FIG. 5a, there are two tables, table1 and table2; A is an attribute of table1; and B and N are attributes of table2. The parameterized DF Net reads all the records in table1 as is shown in procedures and attributes 559. Then, for each table1 record read, the parameterized DF Net reads all table2 records in which the value of B is identical the value of A. This can be seen in procedures and attributes portion 559. In addition to the places and their attributes, table1, table2, A, B and N are also formal parameters of parameterized DF Net 555.

The compute-average parameterized DF Net as shown in FIG. 4 (discussed above) specifies the second generic functionality to compute an average.

For instantiating the parameterized DF Net of FIG. 5a to specify the first functionality for the updating of subject average program, the assignment of explicit formal parameters is achieved as follows:

1) table1→subject
2) table2→result
3) A→subjid
4) B→subjid
5) N→mark

Furthermore, the attributes of the places are assigned as follows:

1) a→subjid
2) n→mark

FIG. 5b shows the actual DF Net 561 resulting from the instantiation. The actual DF Net 561 is comprised of mapping portion 557 and procedures and attributes portion 563.

For instantiating the compute-average parameterized DF Net 444 shown in FIG. 4 to specify the second functionality for the updating of subject average program (compute the average for each subject), no assignment is needed as there is no difference between the actual (the actual places and attributes) and the formal parameters (the places and attributes in the parameterized DF Net). As such, FIG. 4 depicts both the parameterized DF Net 444 and the actual DF Net resulting from the instantiation.

To specify the program to update the subject average, four steps are performed. First, the parameterized DF Net 555 shown in FIG. 5a is instantiated to read the subject records and the associated result records. This creates the actual DF Net 561 shown in FIG. 5b. Second, the parameterized DF Net 444 shown in FIG. 4 is initiated to compute subject averages. Because the instantiation does not cause any changes in this case, the actual DF Net is also the DF Net 444 shown in FIG. 4. Third, the two DF Nets shown in FIGS. 4 and 5b are combined by performing the following assignment:

a) p1→q1
b) p2→q2
c) value→mark

Figure 6:
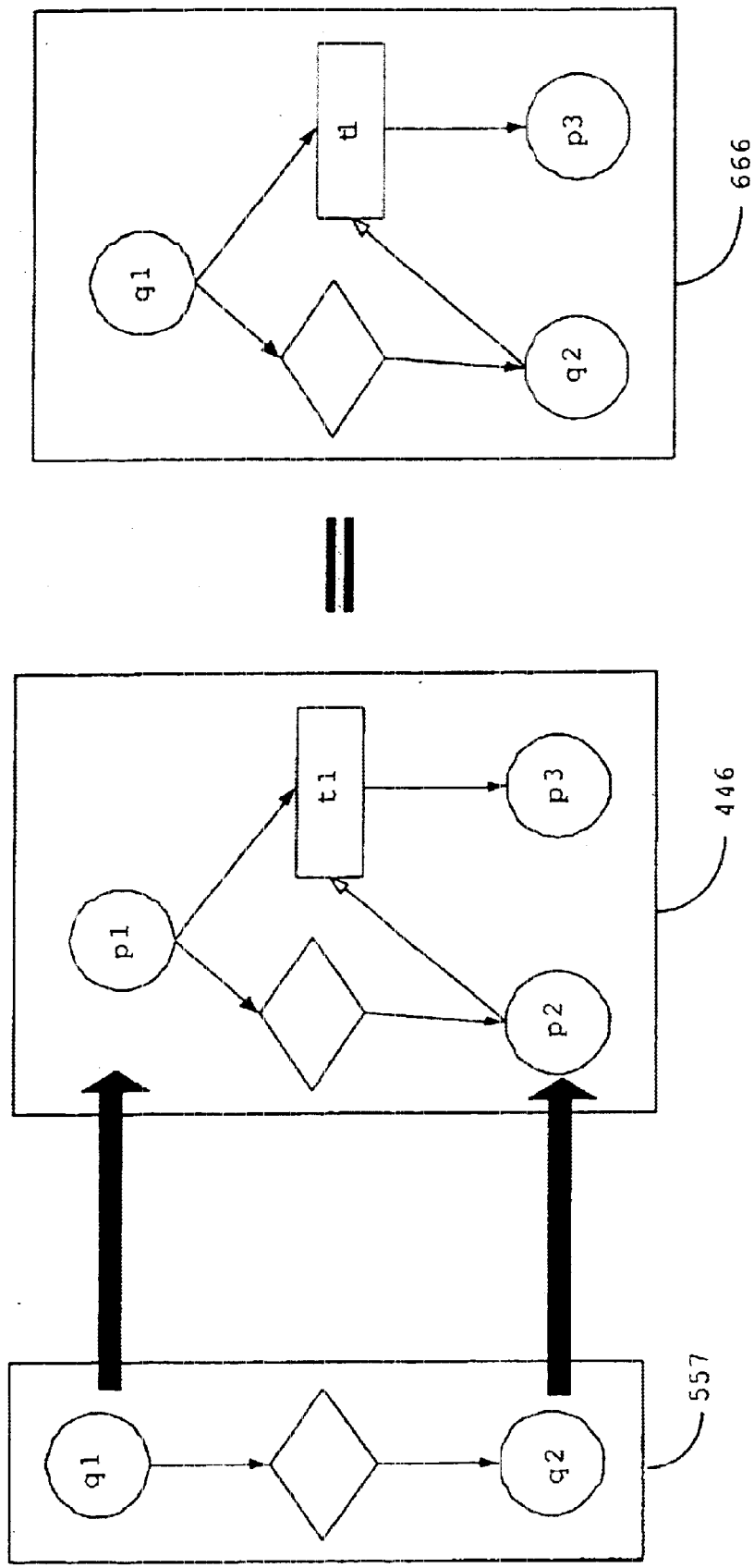
FIG. 6 depicts a mapping showing the assignments of places and transitions needed for the composition of the compute average and join tables DF Nets to form the compute and update subject average DF Net.

The assignment is illustrated in FIG. 6. FIG. 6 depicts the assignment of mapping 446 with mapping 557 to create mapping 666.

Figure 7:
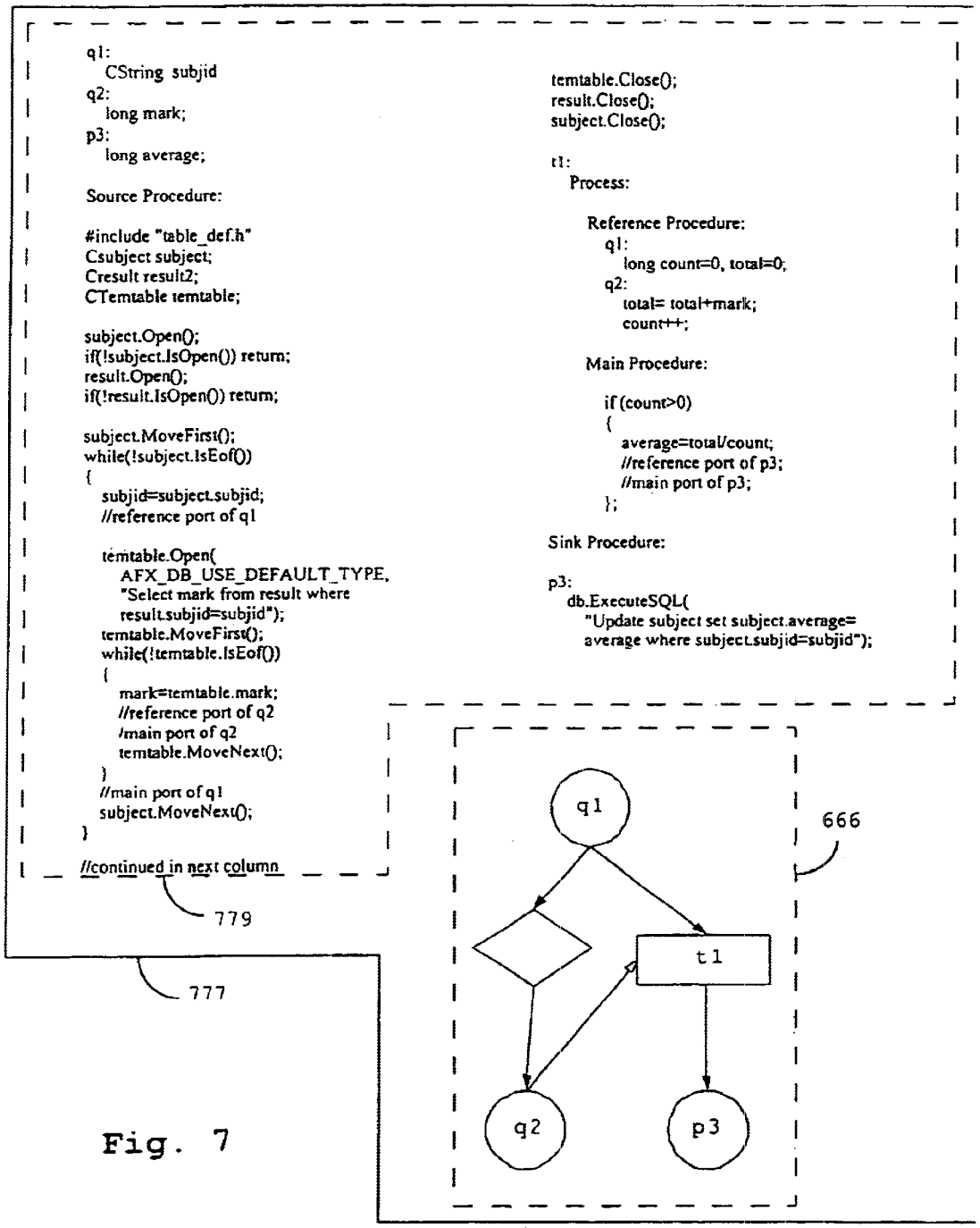
FIG. 7 depicts the compute and update subject average DF Net.

Fourth, and last, the following sink procedure is registered to place p3 to implement the last functionality for the program, namely update subject average:

db.ExecuteSQL("Update subject set subject.average= average where subject.subjid=subjid");

The resulting DF Net 777 is shown in FIG. 7 and is comprised of mapping portion 666 and procedures and attributes portion 779.

Automatic instantiation can be applied to reduce the effort needed in defining the instantiation of a parameterized DF Net. For example, when a place is instantiated to an actual place, if, based on the data types, there is a one-to-one attribute correspondence between the formal places and actual places, then the attribute instantiation can be carried out automatically according to the correspondence. Such is the case with the compute-average DF Net 444 in FIG. 4.

The DF Net methodology can be implemented with known techniques to apply the generation approach. For example, in one embodiment, Visual C++ can be used to generate Graphical User Interface classes to develop application systems. These classes are used to define data flows that are represented by the source classes in the DF Nets. Classes for producing reports can also be generated in a similar manner and used for defining reports for application programs.

F. Representing Analysis and Design Patterns With a Data Flow Net

Analysis and design patterns are promising techniques known to those skilled in the art which support the reuse of analysis and design knowledge and experiences. However, existing specification techniques do no represent analysis and design patterns separately and precisely in a way that allows for evolution from the conceptual stage to the implementation stage. The DF Net of the present invention overcomes this problem.

In one embodiment of the DF Net, analysis and design patterns can be represented. In such an embodiment, a set of parameterized DF Nets supplemented by software artifacts is used to precisely specify an analysis or a design pattern. A DF Net in the set can be optional or can occur multiple times. The set can be stored in a library for reuse. Large analysis or design patterns can be represented by a set of parameterized DF Nets. Such representations can support large-scale reuse.

An analysis or design pattern that is represented by a set of parameterized DF Nets can be instantiated to a set of actual DF Nets. The set is instantiated on an integrated basis. In the instantiation, first, some formal parameters of the set are instantiated to actual values. Next, each parameterized DF Net is instantiated according to the method for the instantiation of the individual DF Net. In this embodiment of the DF Net, analysis or design patterns can be implemented by inheriting from an analysis or design pattern stored in a library. In this embodiment, three levels of inheritance are used: pattern level, DF Net level, and transition and place level.

G. Resolving Recognition Difficulty in an Object Oriented Embodiment

A preferred embodiment of the DF Net separates the functional processing from constraint enforcement that needs to be applied to a particular situation by splitting the specification of a transition into two parts—process and predicate. The process of the transition defines the functional processing. The predicate for the transition defines the constraint in a declarative manner. The separation of constraint enforcement from functional processing enhances the reusability of the functional processing.

In this embodiment, the predicate that is applied to a transition may refer to tokens of output places of the transition or other places that are produced as a result of these output places. Before the firing of the transition, the required tokens of these places have not yet been produced and, therefore, the predicate cannot be evaluated. This type of situation is referred as recognition difficulty.

If the predicate of a transition has recognition difficulty, it must be resolved before a DF Net is transformed into an object-oriented implementation. In general, for each transition, recognition difficulty can be resolved according to one of the following approaches.

One approach is called "Pretend and Really Do." In this approach, for each transition that is required for the production of the places that cause recognition difficulty, a new transition is inserted to imitate what the original transition does. For each sink procedure that is registered to an output place of the transition, a new sink procedure is registered to the corresponding output place of the new transition inserted to imitate what the original sink procedure does, without giving rise to any intolerable effects (for example, database records updated). No predicate is defined for the newly inserted transition that is created for the transition that is resolved for recognition difficulty. The predicate of the transition inserted for any other transition follows the predicate of the latter transition. Finally, each input place in the transition that is resolved for recognition difficulty is replaced by the corresponding place in the new transition. The corresponding replacement, including attributes, is made to any procedure that refers to the place.

The other approach is called "Do and Undo." In this approach, the predicate of the transition resolved for recognition difficulty is removed. For each transition required for the production of the places that cause recognition difficulty, a transition is inserted to imitate what the original transition does. For each sink procedure registered to an output place of the original transition, a sink procedure is registered to the corresponding output place of the transition inserted to undo the intolerable effects of the original sink procedure. For the transition resolved for recognition difficulty, the predicate is defined as the negation of the predicate of the transition. The predicate of the transition inserted for any other transition is defined as the conjunction of the negation of the predicate of the transition resolved for recognition difficulty and the predicate of the latter transition.

For database applications, resolving recognition difficulty can be simplified through the use of a transaction provided in database management systems known in the art. In such an embodiment, for each transition with recognition difficulty, a three step approach is used. First, a transaction-begin statement is inserted at the beginning of the main procedure of the transition. Second, a transition with an output place that has an attribute named To-Fire is inserted. The procedures of the predicate for the transition resolved for recognition difficulty form the corresponding procedures of the process for the transition inserted. A sink procedure is registered to the output place to update the database if To-Fire is set to true and to abort if To-Fire is set to false. Third, the predicate of the transition resolved for recognition difficulty is removed.

H. Transforming a Data Flow Net Into an Object Oriented Implementation

In the embodiment of the DF Net for implementation, all the procedures are written in a target object-oriented programming language such as C++ or Visual C++. In this embodiment, the data flow represented by a place in the DF Net is produced by a source procedure or a main procedure in the DF Net. The location in the software code of the source procedure or the main procedure at which a token of the place is produced is indicated by a tag called the reference port of the place. The location in the software code of the source procedure or the main procedure at which a token of the place and all tokens of descendant places that are related to the place by hierarchical dependencies and are produced as a result of the token are produced, is indicated by a tag called the main port of the place. If there are no other places that are hierarchically dependent on the place and that are produced by the source procedure or the main procedure, the main port is included in software code immediately below the reference port of the place. The reference and main ports of place p3 can be seen in the procedures and attributes 448 in FIG. 4.

When transforming a DF Net for implementation into an executable source program, all transitions in a DF Net are processed one at a time. Two sets, Input-Places-To-Process and Transitions-Processed, are maintained to support the processing. The Input-Places-To-Process set stores places in the DF Net indicating which transitions are ready for processing. If all the input places of a transition are in the Input-Places-To-Process set, the transition is ready to be processed. The Transitions-Processed set stores all the transitions that have been processed.

Figure 8A:
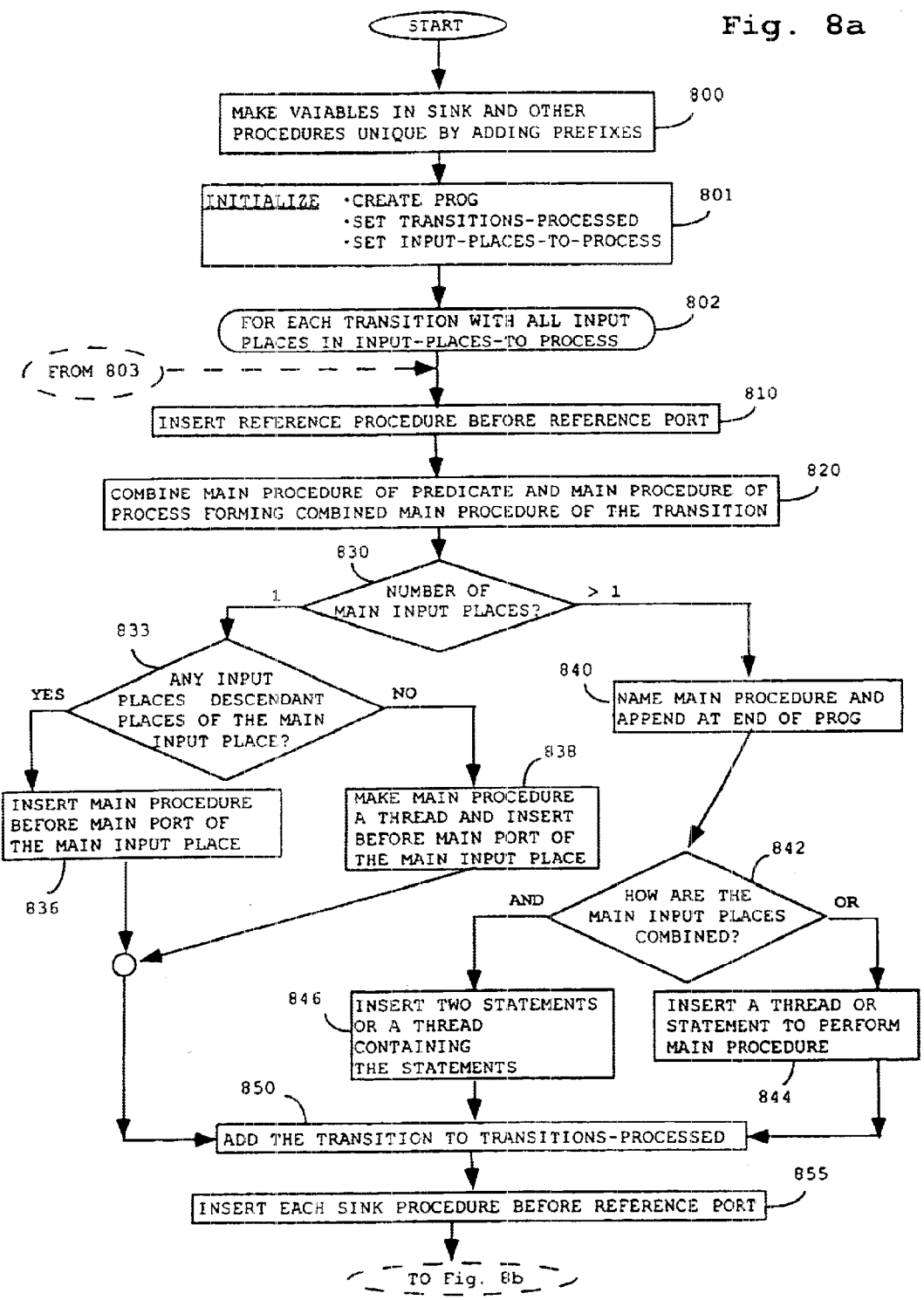
FIGS. 8a, 8b and 8c depict a flow chart of the steps taken in transforming a DF Net specification of a software program into an executable source program.
Figure 8B:
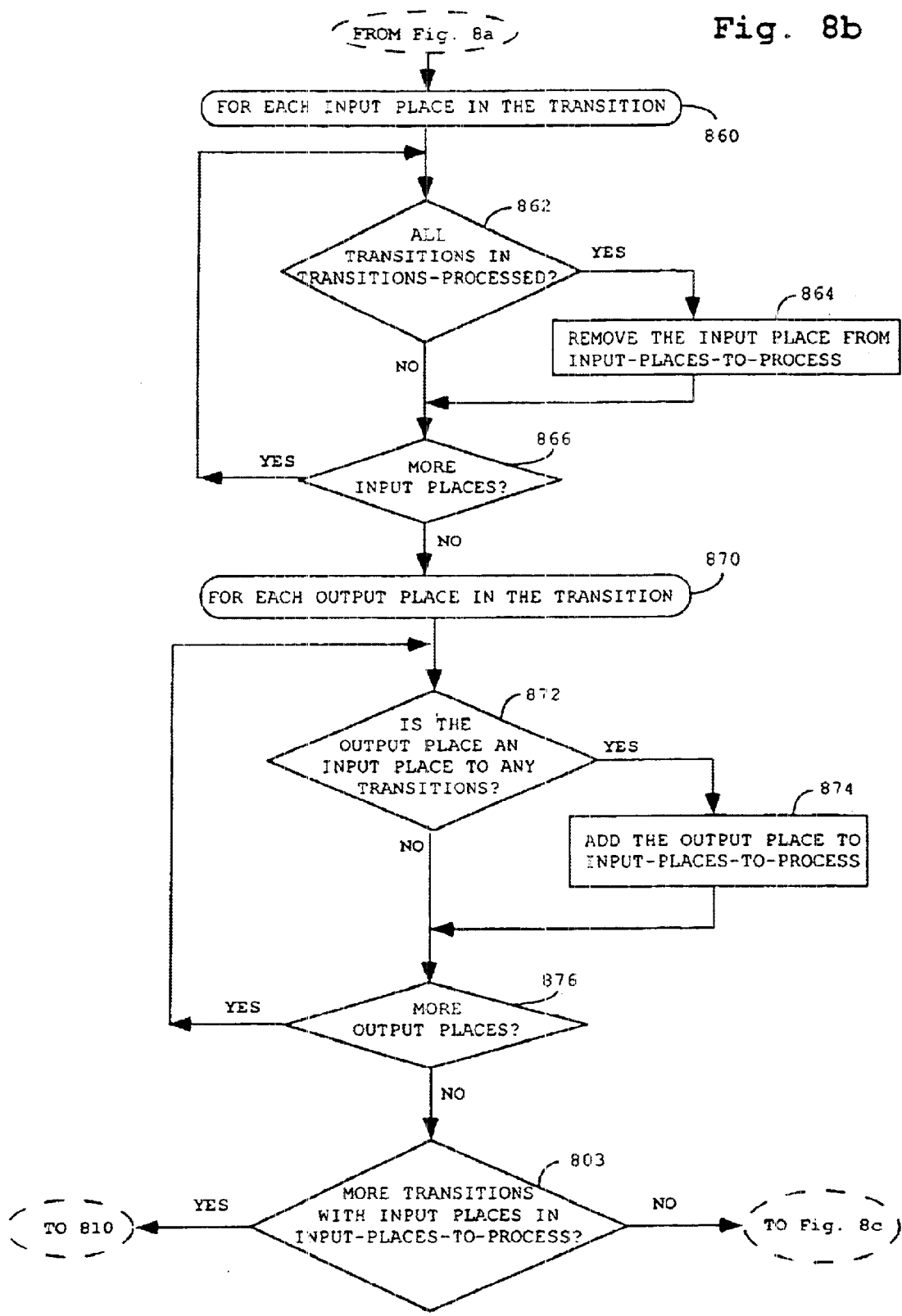
Figure 8C:
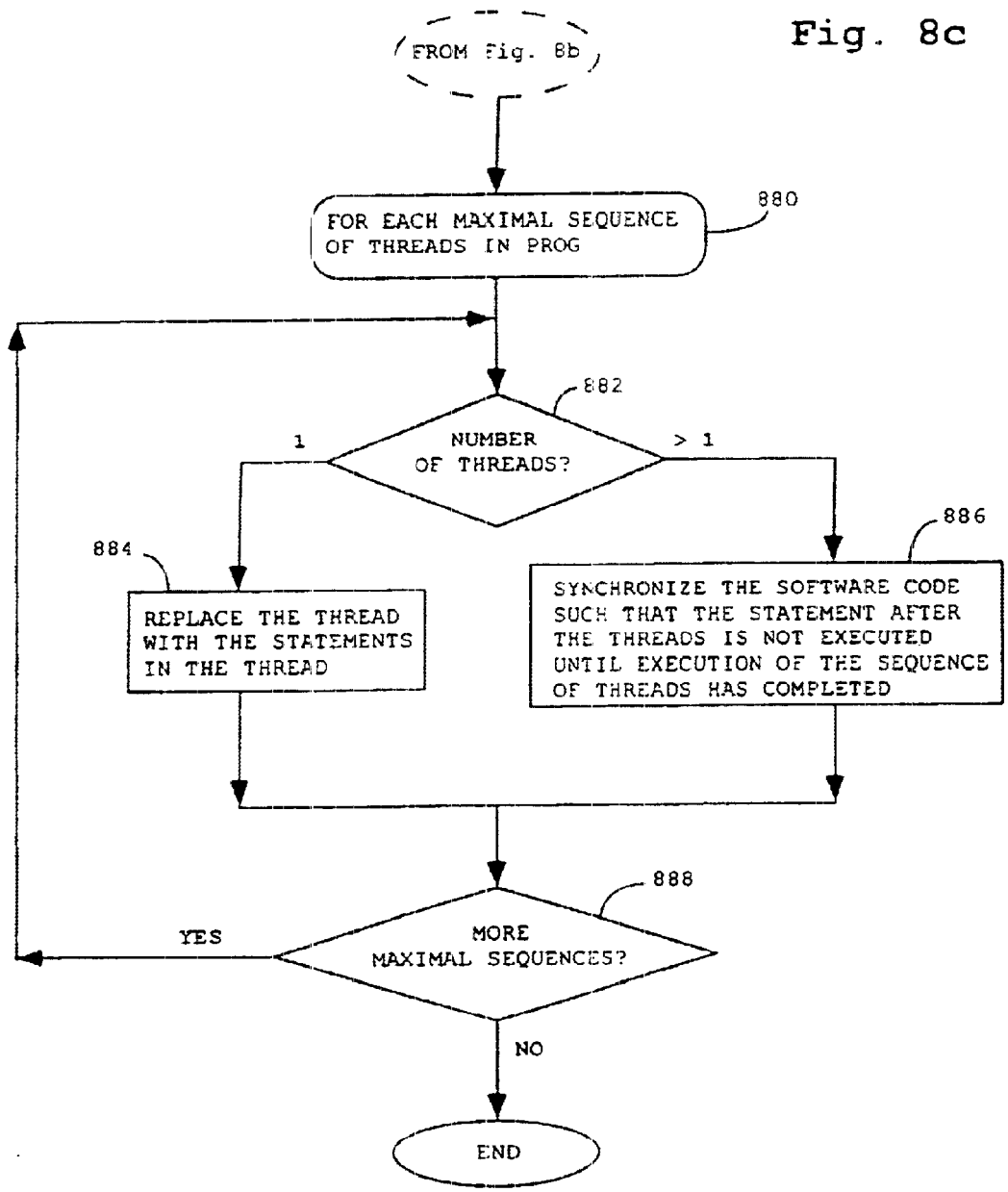

FIGS. 8a, 8b and 8c show the transformation of a DF Net into a source program. In the transformation, each variable declared in a procedure in any transition is made unique by prefixing it with the identification of the transition. Each variable declared in a sink procedure is also made unique by prefixing it with the concatenation of the identification of the place to which it is registered and a number to identify the sink procedure within the place. This can be seen in block 800 of FIG. 8a. For example, if the place p1 is registered with three sink procedures, identified as 1, 2 and 3, if there is a variable "cost" declared in the second sink procedure, the variable is changed to "p12cost" in the second sink procedure. This ensures that the source procedure, the transitions and the sink procedures in the DF Net interface only through places.

Next, the source program Prog for implementing the DF Net is set as the data type declaration for the attributes of all the places appended with the source procedure in the DF Net. Transitions-Processed is set to the empty set. Input-Places-To-Process is set to the set of all source places in the DF Net that serve as an input place to some transitions. This can be seen in initialize block 801 of FIG. 8a.

For each transition in which all the input places are in Input-Places-To-Process, the following process is carried out as shown in block 802 of FIG. 8a.

First, insert each reference procedure of the process and predicate of the transition immediately before the reference port of the place to which the reference procedure is registered, as shown in block 810. Second, insert the main procedure of the predicate of the transitions (if any) at the beginning of the main procedure of the process of the transition to form a combined main procedure of the transition, as shown in block 820.

Transformation then continues based on the number of main input places of the transition as shown in decision block 830. Third, if the transition has only one main input place and some of the transition's input places are descendant places of the main input place, as shown in block 833, then insert the combined main procedure of the transition immediately before the main port of the main input place, as shown in block 836. Otherwise, make the combined main procedure as a thread and insert the thread immediately before the main port of the main input place, as shown in block 838.

Fourth, if the transition has multiple main input places, then append the combined main procedure of the transition at the end of Prog with a procedure name, as shown in block 840. The transformation then continues based on how the main input places are combined, as shown in block 842. For each main input place combined by OR, if some input places are descendant places of the main input place, then insert a statement to perform the combined main procedure immediately before the main port of the main input place in Prog, as shown in block 844. Otherwise, insert a thread at the same location with a statement that performs the transition's combined main procedure. For each main input place combined by AND, if some input places are descendants of the main input place, insert source code statements that perform the following actions (in the sequence shown) immediately before the main port of the main input place: (i) set a flag indicating the readiness of a token of the main input place to ready; and (ii) if the above mentioned flags for all the main input places in the transition are ready, perform the combined main procedure and unset all the flags. If none of the input places are descendant places of the main input place, then insert a thread that contains the same statements at the same location. This is shown in block 846.

Fifth, add the transition to the Transitions-Processed set as shown in block 850. Sixth, for each sink procedure that has not been inserted in Prog and that is registered to a place with a reference port in Prog, insert the sink procedure immediately before the reference port of the place to which the procedure is registered, as shown in block 855. Seventh, for each input place in the transition, if all the transitions in the DF Net in which the input place is an input place are in Transitions-Processed, remove the input place from Input-Places-To-Process. This can be seen in blocks 860, 862, 864 and 866 of FIG. 8b. Eighth, for each output place in the transition that serves as an input place to some transition, include the output place in Input-Places-To-Processed. This is depicted in blocks 870, 872, 874 and 876 of FIG. 8b.

Transformation then continues with processing each resulting maximal sequence of threads in Prog as shown in FIG. 8c. Ninth and finally, for each maximal sequence of threads in Prog: (i) if the sequence has only one thread, then replace the thread by the statements in the thread, as shown in block 884; and (ii) if the sequence has more than one thread, then synchronize the statement immediately after the sequence in such a way that it will only be executed when all the threads in the sequence have completed execution, as shown in block 886.

As an example, the DF Net 777 in FIG. 7 can automatically be transformed into an object-oriented program by doing the following:

1) Prefix the variables declared in the procedures of t1, total and count, with t1. This results in the variables t1total and t1count.
2) Initially, set the program to the data type declaration for all the attributes of q1, q2 and p3 appended with the source procedure.
3) Insert the reference procedure of t1 that is registered to q1 immediately before the reference port of q1.
4) Insert the reference procedure of t1 that is registered to q2 immediately before the reference port of q2.
5) Insert the main procedure of t1 immediately before the main port of q1.

6) Insert the sink procedure of p3 immediately before the reference port of p3.

The resulting program is shown in FIG. 9.

I. Separation of Functionalities

A main reason why computer programs realizing or implementing a use-case are difficult to modify is due to a mismatch between functionalities on the one hand, and design and implementation concepts on the other. Requirements are expressed in terms of functionalities. Design and implementation are expressed in terms of class, method (or operation), message, function, etc. The implementation of all functionalities in a program are intermixed; they are programmed without any separation. Developers are required to delve into the whole program when required to add, change or remove any functionality. The DF Net improves upon existing approaches by separating the implementation of independent sets of functionalities.

The functionalities provided in a program can be broadly classified into two categories. The first category of functionalities is called "acquisition and/or computation of data flow." These functionalities acquire and/or compute the data flows that are required for affecting objects (a functionality of the second category) by accessing other objects, accepting inputs from actors, computation or a combination of these. For example, accepting customer orders, reading student records and computing an average are functionalities of this type. The second category of functionalities is called "affecting object." These functionalities reference the data flow acquired and/or computed by the first category to effect objects. For example, updating records in a table and printing a report are functionalities of this type.

In a preferred embodiment, a program is represented by a DF Net in which different types of functionalities are separately represented. Each set of coherent functionalities is represented according to its type. The "acquisition and/or computation of data flow" functionalities are represented in one of two ways in the DF Net. In the first way, if the data flows are acquired and/or computed without reference to other data flows in the DF Net, the functionalities are represented by the source places, the source procedure and the hierarchical dependencies between the source places. Otherwise, in the second way, the functionalities are represented by a transition. The source procedure and the procedures in the transition interface with objects through the operation of their classes.

For example, in the DF Net to process subject results to update subject average 777 shown in FIG. 7, the reading of subjects and their associated results functionality is represented in the first way. This functionality is separately represented by the source places q1 and q2, as shown in mapping 666, the source procedure, as shown in the procedures and attributes 779, and the hierarchical dependencies between q1 and q2, as shown in mapping 666. The computation of subject average functionality is represented in the second way. It is separately represented by the transition t1 as depicted in both mapping 666 and the procedures and attributes 779 shown in FIG. 7.

The "affecting object" functionalities are represented by a sink procedure that affects objects and the place to which the sink procedure is registered. The place represents the data flow needed to affect the objects. For example, referring to FIG. 7, the update subject average functionality is separately represented by the sink procedure registered to p3 as shown in the procedures and attributes 779 and p3 as shown in mapping 666.

Coherent functionalities are represented according to the above-mentioned types of parts. There is a direct and explicit trace between a set of coherent functionalities and the set's implementation (or realization) in a DF Net. As such, to-change a functionality in a program, only the part in the DF Net that implements the functionality and the part of the DF Net that influences or is influenced by the part need be considered for potential modification. These parts can be computed through slicing.

In a preferred embodiment of a DF Net, for each set of functionalities, the part in the DF Net that is influenced by the set of functionalities is computed by applying forward slicing to the DF Net. Forward slicing is achieved by defining two parts of the DF Net, S and S'. S is initially empty, and S' initially includes the part of the DF Net that implements the set of functionalities. Then, for each place in S' that is either an output place of a transition in S' or a place for which tokens are produced by the source procedure of S', include in both S and S' each transition in the DF Net which has the place as an input place, until no further transitions in the DF Net can be included. Lastly, for each of the above mentioned places in S', include in S the place (if it has not already been included) and each sink procedure that is registered to the place. The resulting S is the part of the DF Net that is influenced by the set of functionalities. It is called a forward slice of the DF Net.

Similarly, the part in the DF Net that influences the set of functionalities can be obtained by applying backward slicing. Backward slicing is achieved by defining two parts of the DF Net, V and V'. V is initially empty, and V' initially includes the part of the DF Net that implements the set of functionalities. For each sink procedure in V', include in both V and V' each transition in the DF Net (if any) in which an output place is the place that is registered with the sink procedure. For each transition t in V', include in both V and V' each transition r in the DF Net that satisfies one of the following conditions, until no further transitions can be included:

a) An input place of t is an output place of r.

b) A reference procedure of t is registered to an output place of r.

c) The main procedure or a reference procedure of t refers to an output place of r. For each transition t in V', include in both V' and V each source place that is an input place of t or that is referenced by the main procedure or a reference procedure of t. If there is a source place in V, include the source procedure in V. The resulting V is the part of the DF Net that influences the set of functionalities. It is called a backward slice of the DF Net.

In addition to the separation of functionalities, a preferred embodiment of the DF Net separates functional processing from constraint enforcement by splitting the specification of a transition into two parts—process and predicate. The process of a transition defines its functional processing. The predicate of a transition defines its constraints in a declarative manner. As such, during software maintenance, if a change of functionality does not affect a particular functional processing, the DF Net allows for changing the predicate without changing the processing. For example, the business policy for a functionality may change, but the functional processing may not change. In existing technology not employing DF Net methodology, such a change is likely to result in a massive revamp of the whole implementation of the use-case.

Separation of what are known in the art as "concerns" is recognized as a problem in existing approaches for constructing software systems. Functionality is one important type of concern in any software system. The DF Net explicitly separates the implementation of each set of coherent functionalities in a program. As such, it addresses the problem. This separation not only makes changing a program easier, it also makes it easier to construct a program. Parts can be assembled to implement the required functionalities to form a program. This technique is not supported by existing approaches not employing DF Net methodology. An additional benefit of the DF Net is that a part that implements a set of coherent functionalities is more reusable than other types of software artifacts of the present.

J. Developing Software Using the Data Flow Net Method

The Uniform Modeling Language of the Unified Software Development Process (UML) is a well-known approach for developing software systems. The DF Net can be used to replace the interaction and activity diagrams in the UML to serve as a unified specification technique for describing the realization of use-cases for both analysis and design purposes. A DF Net created during the design phase can also serve directly as an executable implementation. No further software coding is needed in this embodiment.

The use of the DF Net does not change the process of requirements capturing in the Unified Software Development Process. However, in the analysis stage, the DF Net differs for the realization of use-cases. In the Unified Software Development Process, a use-case is realized through objects sending messages to and receiving messages from each other. In one embodiment of the DF Net, a use-case is realized through acquisition and/or computation of data flows from objects, and sinking of data flows into objects (that is, using the data flows to affect objects). For each use-case in the requirement model, the following tasks are performed to construct a DF Net to realize the use case.

First, the data flows from and to actors are identified. These data flows are acquired from and delivered to user interface objects. Each of these data flows is represented by a place, and any hierarchical dependencies between these places are specified. In drawing the DF Net diagram, the names of interface objects that deal with the data flow represented by a place are written next to the place.

Second, data flows that are required for affecting objects are identified. All these data flows are represented as places, and any hierarchical dependencies between these places are also represented. In drawing the DF Net diagram, the names of objects that are affected by the data flow represented by a place are written next to the place.

Third, acquire and/or compute identified data flows by either interacting with objects and/or by computation. Data flows from actors identified earlier are acquired from user interface objects. Data flows to actors described in the identified data flows may be acquired and/or computed through interacting with objects and/or by computation. Each acquisition and/or computation of coherent data flows through reference to other data flows is specified by a transition. Each acquisition and/or computation of coherent data flows without reference to other data flows is specified by a source procedure defined for the whole DF Net. During analysis, each transition is only defined informally by a natural language textual description; the transitions will not be defined precisely according to the DF Net construct. The source procedure will also be defined informally. In drawing the DF Net diagram, the name of the objects interacted is written next to either the transition or the source places if there is no transition involved in the interaction to objects.

Fourth, sink procedures for affecting objects are registered. Each sink procedure is defined informally during the analysis stage.

During the four above-mentioned tasks, each interaction to objects implies that the objects are responsible for supporting the interaction. Each effect on objects implies that the objects are responsible for implementing the effect. The attributes of the associated data flows also help to identify the attributes the objects should have. In the same manner as with the Unified Software Development Process, the object and attribute requirements for all the use-case realizations are consolidated to form a class diagram showing attributes. The above mentioned responsibilities for the objects are also consolidated to form the responsibilities of the respective analysis classes to which they belong.

In the design stage, each use-case realization produced from the analysis stage is refined to take into consideration the implementation environment and the constraints. The analysis classes are refined accordingly to form design classes with operations included. The responsibilities of a class are used as input to determine the operations required for the class. A method is defined in the target object-oriented programming language to implement each operation. Each informal transition description is expanded to an exact transition specification according the DF Net architecture. That is, each transition is specified by a process and possibly with a predicate. Both are specified by sets of procedures in the target programming language. The operations of classes are used to define the procedures. The source and sink procedures are also defined in the target programming language in the same way. A DF Net produced for the realization of a use-case in the design stage is executable. No additional work is required for implementation.

In one embodiment, DF Nets for both analysis and design stages are produced from reusable DF Nets stored in libraries. Commonly used functionalities, analysis patterns and design patterns are defined as parameterized DF Nets and stored in libraries for reuse. Reusable DF Nets from libraries are used to realize and implement a use-case. An analysis of design patterns may be specified as a set of parameterized DF Nets. A set of related use-cases is realized and implemented in one step by constructing a set of DF Nets from an analysis or design pattern stored in a library. Classes required for a system are also defined through the use of reusable classes as in the object-oriented embodiment. In this embodiment, the DF Net extends the support of software reuse when compared to present systems and methods.

The use of the DF Net in software development has numerous benefits. The DF Net of the present invention provides better support for reuse of software. Many reusable software parts that provide coherent functionalities cannot be separately and precisely specified by existing design and implementation techniques. As an improvement over existing techniques, by using the DF Net method, software parts can be specified separately and reused efficiently. The DF Net achieves this by providing comprehensive representation and composition structures for software parts used in constructing software systems.

The DF Net of the present invention provides for a more natural use-case realization. The proposed approach realizes a use-case through acquisition and/or computation of data flows from objects and sinking of data flows into objects. This is a more natural way than the method used in Unified Software Development Process.

Moreover, the DF Net of the present invention allows for seamless transition from design to implementation. The DF Net design realization of a use-case produces an implementation of the use-case such that no further coding is needed once the design is completed.

The commercial application of data flow nets can be classified into two areas: software development environments and application software packages. In the software development environment area, the DF Net can be used as a front-end specification method in conjunction with existing visual software development environments for specifying and developing programs. The specifications in DF Net methodology can be automatically transformed into existing object-oriented languages for implementation. The DF Net enables software programmers using existing visual software development environments such as Visual C++ or JDK, for example, to assemble individual programs from parts that implement required functionalities that cannot currently be specified and developed separately. The DF Net also enables programmers in these kinds of development environments to assemble multiple programs in one step from design patterns.

In the application software area, the DF Net can be used as an architecture for application software packages. An application package for a specific domain is organized in the form of a set of standard parts and assemblies of parts, each of which provides a set of related functionalities. Implementation of the application package for a particular customer is carried out by the assembly of standard artifacts and other parts that are developed specifically for the customer. In this way, the DF Net makes the implementation of application software easier. The DF Net alleviates the massive effort required with existing technology to customize a software application package.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for specifying computer software comprising:

designating a source procedure;

designating a plurality of hierarchical dependencies;

for each of a plurality of transitions, designating
  (i) at least one input place and at least one output place from a plurality of places, wherein the transition produces said at least one output place from said at least one input place, and wherein said at least one input place is a main input place,
  (ii) a process including a set of reference procedures and a main procedure, said main procedure to execute upon the firing of the transition to which the process is designated;

designating a plurality of sink procedures;

wherein for each of said plurality of transitions, further designating a predicate including a set of reference procedures and a main procedure;

assigning to each place no more than one token, wherein said token represents an instance of a data flow and wherein said data flow represents a set of variables accessible at a statement in the software, wherein a plurality of main input places are designated for at least one transition, and wherein the reference procedures only refer to:
  (a) variables represented by attributes of the place to which the reference procedure is registered,
  (b) variables represented by attributes of:
    (i) any main input places of the transition that are ancestor places of the place to which the reference procedure is registered,
    (ii) any ancestor places of main input places of the transition that are ancestor places of the place to which the reference procedure is registered, if the place is not a main input place, or
    (iii) any ancestor places of the place to which the reference procedure is registered, if the place is a main input place,
  (c) if the reference procedure is included in a process, variables defined in other reference procedures of the process of the transition registered to:
    (i) any main input places of the transition that are ancestor places of the place to which the reference procedure is registered,
    (ii) any ancestor places of main input places of the transition that are ancestor places of the place to which the reference procedure is registered, if the place is not a main input place, or
    (iii) any ancestor places of the place to which the reference procedure is registered if the place is a main input place, and
  (d) if the reference procedure is included in a predicate, variables defined in other reference procedures of the predicate of the transition registered to:
    (i) any main input places of the transition that are ancestor places of the place to which the reference procedure is registered,
    (ii) any ancestor places of main input places of the transition that are ancestor places of the place to which the reference procedure is registered, if the place is not a main input place, or
    (iii) any ancestor places of the place to which the reference procedure is registered if the place is a main input place.

2. A method for specifying computer software comprising:

designating a source procedure;

designating a plurality of hierarchical dependencies;

for each of a plurality of transitions, designating
  (i) at least one input place and at least one output place from a plurality of places, wherein the transition produces said at least one output place from said at least one input place, and wherein said at least one input place is a main input place,
  (ii) a process including a set of reference procedures and a main procedure, said main procedure to execute upon the firing of the transition to which the process is designated;

designating a plurality of sink procedures;

wherein for each of said plurality of transitions, further designating a predicate including a set of reference procedures and a main procedure and executing the main procedure of the process of the transition after the execution of the main procedure of the predicate of the transition;

assigning to each place no more than one token, wherein said token represents an instance of a data flow and wherein said data flow represents a set of variables accessible at a statement in the software, wherein a plurality of main input places are designated for at least one transition, and wherein the predicate:
defines a Boolean variable for the transition such that the main procedure of the transition executes only when the Boolean variable is evaluated as TRUE;
produces no tokens;
defines no attributes of any places; and
for each of the plurality of transitions, executing the main procedure of the process of the transition after the execution of the main procedure of the predicate of the transition,
wherein executing the main procedure of the process begins when:
(a) if the transition has one main input place, at least one token of the main input place has not participated in any execution of the main procedure; if the transition has multiple main input places combined by AND logic, at least one token of each main input has not participated in other execution of the main procedure; if the transition has multiple main input places combined by OR logic, at least one of the main input places must have at least one token which has not participated in other execution of the main procedure; and
(b) all the tokens of the non-main input places that are descendant places of any main place of the transition that can be produced as a result of the tokens involved in (a) have been produced; and
(c) the Boolean variable for the transition is set to true.

3. A method for specifying computer software comprising:
designating a source procedure;
designating a plurality of hierarchical dependencies;
for each of a plurality of transitions, designating
(i) at least one input place and at least one output place from a plurality of places, wherein the transition produces said at least one output place from said at least one input place. and wherein said at least one input place is a main input place,
(ii) a process including a set of reference procedures and a main procedure, said main procedure to execute upon the firing of the transition to which the process is designated;
designating a plurality of sink procedures,
wherein those parts that are influenced by a plurality of functionalities or influence the plurality of functionalities are extracted from a computer software specification,
wherein extracting is achieved by forward slicing comprising:
(a) defining a forward slice and a temporary part as parts of the computer software specification;
(b) initializing the forward slice to empty;
(c) initializing the temporary part to include the part of the computer software specification that implements the plurality of functionalities; and
(d) for each place in the temporary part that is either an output place of a transition in the temporary part or a place for which tokens are produced by the source procedure of the temporary part, including the following in the forward slice
(i) each transition in the computer software specification which has the place as an input place, until no further transitions in the computer software specification can be included,
(ii) the place, if the place has not already been included, and (iii) each sink procedure registered to the place in the computer software specification.

4. A method for specifying computer software comprising:
designating a source procedure;
designating a plurality of hierarchical dependencies;
for each of a plurality of transitions designating
(i) at least one input place and at least one output place from a plurality of places, wherein the transition produces said at least one output place from said at least one input place, and wherein said at least one input place is a main input place,
(ii) a process including a set of reference procedures and a main procedure, said main procedure to execute upon the firing of the transition to which the process is designated;
designating a plurality of sink procedures,
wherein those parts that are influenced by a plurality of functionalities or influence the plurality of functionalities are extracted from a computer software specification,
wherein extracting is achieved by backward slicing comprising:
(a) defining a backward slice and a temporary part as parts of the computer software specification;
(b) initializing the backward slice to empty;
(c) initializing the temporary part to include the part of the computer software specification that implements the plurality of functionalities;
(d) for each sink procedure in the temporary part, including in both the backward slice and the temporary part each transition in the computer software specification, if any, in which one of the output places of the transition is registered with the sink procedure;
(e) for each of a plurality of first transitions from the temporary part, including in both the backward slice and the temporary part each of a plurality of second transitions from the computer software specification that satisfies at least one of the following conditions:
i) any input place of the first transition is an output place of the second transition,
ii) any reference procedure of the first transition is registered to any output place of the second transition, and
iii) the main procedure or any reference procedure of the first transition refers to any output place of the second transition;
(f) for each of the first transitions in the temporary part, including in the backward slice each source place that is an input place of the first transition or that is referred to by the main procedure or any reference procedure of the first transition; and
(g) including the source procedure from the computer software specification in the backward slice if there is a source place in the backward slice.

5. A method for assembling a third part of computer software from a first part of computer software and a second part of computer software wherein the first part, the second part and the third part are specified according to a method for specifying computer software comprising:
designating a source procedure;
designating a plurality of hierarchical dependencies;
for each of a plurality of transitions, designating
(i) at least one input place and at least one output place from a plurality, of places, wherein the transition produces said at least one output place from said at least one input place, and wherein said at least one input place is a main input place, (ii) a process including a set of reference procedures and a main procedure, said main procedure to execute upon the firing of the transition to which the process is designated;

designating a plurality of sink procedures;

wherein for each of said plurality of transitions, further designating a predicate including a set of reference procedures and a main procedure;

assigning to each place no more than one token, wherein said token represents an instance of a data flow and wherein said data flow represents a set of variables accessible at a statement in the software, wherein a plurality of main input places are designated for at least one transition, wherein the first part includes a first set of input places, a first set of output places, a first set of transitions, a first set of hierarchical dependencies, a first source procedure, a first set of reference procedures, and a first set of sink procedures; the second part includes a second set of input places, a second set of output places, a second set of transitions, a second set of hierarchical dependencies, a second source procedure, a second set of reference procedures and a second set of sink procedures; and the third part includes a third set of input places, a third set of output places, a third set of transitions, a third set of hierarchical dependencies, a third source procedure, a third set of reference procedures and a third set of sink procedures, said method comprising:

defining a shared set of places as those input places of the second set of input places which correspond to one of the output places of the first set of output places;

determining the third source procedure by asynchronously combining the first source procedure and second source procedure;

mapping each input place of the second set of input places in the shared set to a corresponding output place of the first set of output places, said mapping designated an IP mapping;

mapping each attribute of each input place of the second said set of input places in the shared set of places to a compatible attribute of the place corresponding to IP mapping of each place in the shared set, said mapping designated an AIP mapping;

determining the third set of input places as the union of the first set of input places and those input places in the second set of input places which are not in the shared set;

deriving the third set of transitions from the union of the first set of transitions and the second set of transitions, said third set of transitions further comprising those transitions in the second set of transitions involving places in the shared set wherein to each transition of the second set of transitions involving places in the shared set the following modifications are made before inclusion in the third set of transitions:

replacing each input place in the shared set with the place corresponding to the IP mapping the input place, replacing each variable of each reference procedure and each variable of each main procedure that is an attribute of a place in the shared set with the attribute corresponding to the AIP mapping of the attribute of the place, and registering each of the reference procedures registered to a place in the shared set with the place corresponding to the IP mapping of the place in the shared set;

deriving a third set of sink procedures from the union of the first set of sink procedures and the second set of sink procedures such that the following modifications are made before inclusion in the third set of sink procedures:

replacing each variable of each sink procedure that is an attribute of any place in the shared set with the attribute corresponding to the AIP mapping of the attribute of the place, registering each of the sink procedures that is registered to any place in the shared set with the place corresponding to the IP mapping of the place;

deriving the third set of hierarchical dependencies as the union of the first set of hierarchical dependencies and the second set of hierarchical dependencies such that the hierarchical dependencies between places in the shared set are removed; and maintaining the ancestor place and descendant place relationships between places in the third set of places among those places that were incorporated from the second set of input places.

6. The method of claim 5 wherein maintaining the ancestor place and descendant place relationships between places includes:

ensuring that the IP mapping of each first place of the second set of places that is in the shared set which was an ancestor place of a second place in the set of second input places which is not in the shared set remains an ancestor place of the second place;

ensuring that a first place of the second set of places that is not in the shared set which was an ancestor place of a second place in the set of second input places which is in the shared set becomes an ancestor place of the IP mapping of the second place;

ensuring that a first place of the second set of places that is in the shared set which was an ancestor place of a second place in the set of second input places which is also in the shared set maintains its hierarchy such that the IP mapping of the first place is a ancestor place of the IP mapping of the second place.

7. A method of transforming computer software specified into an object oriented programming language according to a method, specifying computer software comprising:

designating a source procedure;

designating a plurality of hierarchical dependencies;

for each of a plurality of transitions, designating (i) at least one input place and at least one output place from a plurality of places, wherein the transition produces said at least one output place from said at least one input place, and wherein said at least one input place is a main input place, (ii) a process including a set of reference procedures and a main procedure, said main procedure to execute upon the firing of the transition to which the process is designated;

designating a plurality of sink procedures;

wherein for each of said plurality of transitions, further designating a predicate including a set of reference procedures and a main procedure;

assigning to each place no more than one token, wherein said token represents an instance of a data flow and wherein said data flow represents a set of variables accessible at a statement in the software, wherein a plurality of main input places are designated for at least one transition, renaming each variable of each transition if the variable is not unique among all transitions;

designating a source program, allocating a transitions-processed variable to store transitions that have been processed and initializing the transitions-processed variable to empty, and allocating an input-places-to-process variable to store the input places of transitions when the input place of any transition is ready to be processed, and initializing the input-places-to-process variable to the set of all source places that serve as input places to the transitions;

forming the source program by merging the source procedure, the main procedure, the reference procedures and the sink procedures by processing each transition when all its input places are in input-places-to-place, said processing including:

inserting each sink procedure before the reference port for the place to which the sink procedure is registered, inserting each reference procedure before the reference port for the place to which the reference procedure is registered, and inserting the main procedure responsive to the number of input places and whether any input places are descendents of a main input place; and synchronizing each maximal sequence of threads.

8. The method of claim 7 wherein renaming includes prefixing non-unique variables with the name of the transition in which the variable is declared.

9. The method of claim 7 wherein inserting the main procedure includes:

if there is a single main input place and at least one input place is a descendent of the main input place, inserting the main procedure before the main port of the main input place;

if there is a single main input place and no input places are descendents of the main input place, designating the main procedure as a thread and inserting the main procedure thread before the main port of the main input place;

if there are multiple main input places, naming the main procedure and appending it at the end of the main program.

10. The method of claim 7 wherein if there are multiple main input places further includes:

if one or more input places is a descendant of the main input places and the main input places are combined by OR logic, inserting the main procedure as a statement before the main port of each main input place;

if no input place is a descendant of the main input places and the main input places are combined by OR logic, inserting the main procedure as a thread before the main port of each main input place;

if one or more input place is a descendant of the main input places and the main input places are combined by AND logic, inserting statements before the main port of each main input place (a) to define a status variable reflecting the status of each of two or more conjunctive main input places, and (b) to execute the main procedure such that the main procedure will not begin execution until all status variables are set to ready;

if no input place is a descendant of the main input places and the main input places are combined by AND logic, inserting a thread containing statements before the main port of each main input place (a) to define a status variable reflecting the status of each of two or more conjunctive main input places, and (b) to execute the main procedure such that (1) the main procedure will not begin execution until all status variables are set to ready, and (2) the status variables are reset to not ready when the main procedure begins.

11. The method of claim 7, wherein synchronizing includes:

if the sequence has one thread, replacing the thread by the statements in the thread; and if the sequence has more than one thread, synchronizing the threads such that a statement after all of the threads will only be executed when all the threads have completed execution.

* * * * *